US005634091A

United States Patent [19]

Sands et al.

[11] Patent Number: 5,634,091

[45] Date of Patent: May 27, 1997

[54] DIGITAL PAGE IMAGING SYSTEM

[75] Inventors: Gerald K. Sands, Crawfordsville, Ind.; Ilario J. Alvino, Naperville, Ill.; Dennis M. Beach, Crawfordsville, Ind.; Steve L. Coffman, Aurora; Charles A. Cornelius, Wheaton, both of Ill.; Glenn E. Dieckmann, Crawfordsville, Ind.; Linda M. Krause, Elmhurst, Ill.; Albert C. W. Loo, Chicago, Ill.; J. Thomas Shively, Hinsdale, Ill.; James L. Warmus, LaGrange, Ill.; Mary O. Bukowski, Elmhurst, Ill.

[73] Assignee: R. R. Donnelley & Sons Company, Lisle, Ill.

[21] Appl. No.: 738,217

[22] Filed: Jul. 30, 1991

[51] Int. Cl.⁶ .................... G06K 15/00

[52] U.S. Cl. .................... 395/117; 101/453

[58] Field of Search .................... 395/115, 116, 395/117, 101, 145–149, 162–164; 101/453, 463.1, 464, 465–467, 450.1

[56] References Cited

U.S. PATENT DOCUMENTS

| | | | |
|---|---|---|---|
| 4,718,784 | 1/1988 | Drisko | 395/117 |
| 4,928,252 | 5/1990 | Gabbe et al. | 395/112 |
| 5,021,975 | 6/1991 | Yamanashi | 395/115 |

OTHER PUBLICATIONS

"Poststrip" manual, Copyright 1989, Ultimate Technographics, Inc.

"Press Imposition for IBM 4250/General Information", R. R. Donnelley & Sons Company, Feb. 21, 1989.

*Primary Examiner*—Arthur G. Evans
*Attorney, Agent, or Firm*—Wood, Phillips, VanSanten, Clark & Mortimer

[57] ABSTRACT

A digital page imaging (DPI) system receives customer transmitted technical document files produced on a desktop publishing package and ensures that the documents are produced properly. The system provides an easy to use interface, reduces turnaround time in processing customer work, and eliminates errors associated with manual imposition processes. The DPI system consists of a work station, modem and related telecommunication link, a photo typesetter and a software package for automatically imposing flats for printing on the typesetter.

30 Claims, 38 Drawing Sheets

PRESS DATABASE MODULE
DELIVERY INFORMATION

PRINTER MARK MODULE
PRINTERS MARK INFORMATION

VERIFY MODULE

VERIFY MODULE
STRINGOUT

IMPOSITION MODULE

IMPOSITION MODULE

DIGITAL PAGE IMAGING SYSTEM

FIELD OF THE INVENTION

This invention relates to printing and binding operations and, more particularly, to a prepress digital page imaging system therefor.

BACKGROUND OF THE INVENTION

In modern printing operations it is desirable to print a maximum number of pages during each revolution of a press cylinder. Typically, this desire is satisfied by printing a signature which forms a section of multiple pages for a book. During a later binding operation the signature is folded with the end result being that the printed pages are in a proper orientation and position.

In order to print a signature, it is necessary that the printing plate include all of the pages in the proper orientation relative to one another. This process is known as imposition. Imposition has generally been done manually. A film comprising a scaled image of each page is manually positioned on a template for a particular signature printing to create a flat. The flat may be exposed, for example, on a photosensitive aluminum plate ultimately used for printing. The individual pages can be bottled or shingled as necessary.

The above-described manual imposition process requires that the operator initially choose the correct imposition template and then properly position the film for each page to create the flat. This is a time consuming process which adds inaccuracies to the system.

More recently, customers have used desktop publishing software to create the pages for documentation with all text, graphics, half-tone and spot colors in place. While this permitted the customer to proof the individual pages prior to printing, the manual imposition process remained.

Systems have further been automated by the ability to transmit customer page data to the printer who could then use a film printer for printing film for each page. Again, these pages were manually imposed.

It is desirable to provide an automated imposition system which is easy to interface with customer electronic publishing systems, provides output at desired quality expectations, is inexpensive and is useful with existing production capabilities.

The present invention is intended to overcome one or more of the problems discussed above.

SUMMARY OF THE INVENTION

In accordance with the invention, there is provided a digital page imaging system which automatically imposes page masters in a correct order for a printing press.

Broadly, there is disclosed herein an imaging system for converting data representing a plurality of pages in a defined page description language format to produce files of imposed page data for imaging to film flats. The imposition system includes first memory means for electrically storing a data file representing a plurality of discrete pages in a defined page description language format and second memory means for electrically storing press imposition data for a plurality of press deliveries each representing relative position of pages on an imposed flat. Selection means are provided for selecting a single press delivery from the plurality stored in the second memory means. Programmed control means are operatively associated with the first and second memory means and responsive to the selection means for converting data stored in the first memory means for a plurality of pages to a file of imposed page data for the selected press delivery. Output means are driven by the programmed control means for imaging a film flat using the imposed page data for the selected press delivery.

In accordance with another aspect of the invention there is provided communication means operatively connected to the first memory means for electronically receiving data files representing a plurality of discrete pages in a defined page description language format for storage in the first memory means.

It is a feature of the invention that the programmed control means further comprises form breakup means for breaking a data file stored in the first memory means into a plurality of form files, each form file defining select pages from the data file to be included on a select film flat according to the selected press delivery.

It is a further features of the invention that the programmed control means converts data stored in the first memory means to be a plurality of files of imposed page data, one for each form file.

It is a further feature of the invention that the output means comprises a film recorder.

It is yet another feature of the invention that the programmed control system comprises a programmed central processing unit and a first and second memory means comprise memory storage devices electrically coupled to and controlled by the CPU.

It is yet another feature of the invention that a modem is provided connected to the CPU for receiving data files to be stored in the first memory means.

It is another feature of the invention that spooling means are provided operatively disposed between the programmed control means and the output means for controlling transfer of data from the programmed control means to the output means.

It is still a further feature of the invention that the data file stored in the first memory means could be prepared using any one of a plurality of desktop publishing programs and the programmed control means includes processing means for converting the data file to a processed data file having standard page data for use in converting to imposed page data.

It is yet an additional feature of the invention that the programmed control means includes means for repositioning page data for any select page to ensure proper position of the page in a completed book.

In the printing industry, imaging refers to the transformation of customer input or copy into a medium that is reproducible for printing. This transformative process is known as preliminary or prepress. Previously, prepress work involved receiving reproducible paper images of the pages, checking all of the copy manually, and converting the same to film. The latter step required color separating page images and film and assembling all images for each page. Imposition layout sheets were developed to indicate which page goes in which position for each press form used to draw a film lineup template. The film pages were lined up according to the press imposition into film flats so that all pages appear in their proper locations, with correct margins and orientations after printing. The film flats were opaqued or spotted to correct image flaws introduced by a camera and contacting operation. Proof created from the flats were then sent to the customer for checking and subsequent correction. Printers' quality marks were added to the film and/or plates to identify each plate and allow the printing and binding departments to carry out necessary quality practices. Finally, the printing plates were made for the printing press, from the corrected film flats in a vacuum frame with film and plates in contact.

Typically, the above operation involved a turnaround time on the order of ten days. The use of the digital page imaging system disclosed herein, including its communications features, can reduce turnaround time to less than one day assuming proper data is received from the customer. Further, the system allows the simultaneous imaging of any customer's files in different plants with different printing presses, methods and impositions to allow simultaneous worldwide release of customers' documentation. Further, as imaging and printing methods vary, the system is designed to support an infinite variety of printing media, such as film flats for offset printing, files for direct xerographic or LED electronic demand printing directed to plate making devices, plain paper laser printers, and others.

The digital page imaging system eliminates many of the above described manual operations by utilizing the concepts identified below. Standard page description language format is used to allow receipt of electronic or digital pages from dozens of different available publishing systems. The DPI software filters and interprets pages from the various publishing system software drivers and uses a communication network so that pages created by a customer could quickly be received at the printer. A job specification file and an electronic collation or stringout file is provided by which each customer describes the job variables for each title. Software is provided to image film flats and plates per customer job specifications based on known printing knowledge and practices. The system electronically stores all press impositions for all printing presses and provides for press impositions and film layouts for every press form, no matter where the job is printing. The software is able to select customer pages from digital files randomly and place their images directly into proper press impositions for film flats and printing plates and include printer's marks along with customer page images according to manufacturing requirements. The system is flexible to facilitate implementation of various output processes or devices where practical and necessary.

More particularly, the concepts are implemented in a integrated system wherein customer pages are received electronically and then all customer images and printer quality marks are imaged into fully imposed, fully plate ready film flats. The system recognizes for each customer file its source and applies proper logic filters and rewrites the file into a standard format to allow for generic processing throughout the remainder of the process. Particularly, the software reads through and verifies the reasonability and consistency of the customer electronic input. If exceptions are detected, then they are noted for resolution with the customer. The software maintains separation of supplied color separated page images to color register in the resultant imaging to film flats or plates. The different color separation techniques used by the different publishing programs are transparent to the final imaging. The software provides for all translations and small angle rotations to accomplish shingling and bottling. Further, the software contains functions that parse customer files, rewrite them and create index files which record where each page begins and the length of each page to support random selection of page images required by the automatic imposition process. The system assigns every page of a customer product into its exact position and orientation in every film and plate needed to print the entire product. Particularly, these positions yield exact margins, with page heads turned properly to account for press folding, and with shingling and bottling included. This is accomplished by embedding commands in the customer's data files without altering their inherent images. This process functions without regard to which printing plant, press or binders are employed so that it is a universal solution. Further, printers' quality marks are added by the software, with each mark placed in its proper position, size and orientation, in such ways as not to alter or interfere with the customer images. Finally, the design is generalized so that the output device used is transparent to the process. The primary output device is a film image setter used for creating printing plates, although other output devices can be used as necessary or desired.

Further features and advantages of the invention will readily be apparent from the specification and from the drawings.

BRIEF DESCRIPTION OF THE DRAWINGS

FIGS. 4A-1 through 4G-2 comprise a flow diagram illustrating a software implementation for a press database module of FIG. 3;

FIGS. 7A-1 through 7C comprise a flow diagram illustrating a software implementation for a printer's mark module of FIG. 3;

FIGS. 9A-1 through 9E comprise a flow diagram illustrating a software implementation for a verify module of FIG. 3;

Figure 3:
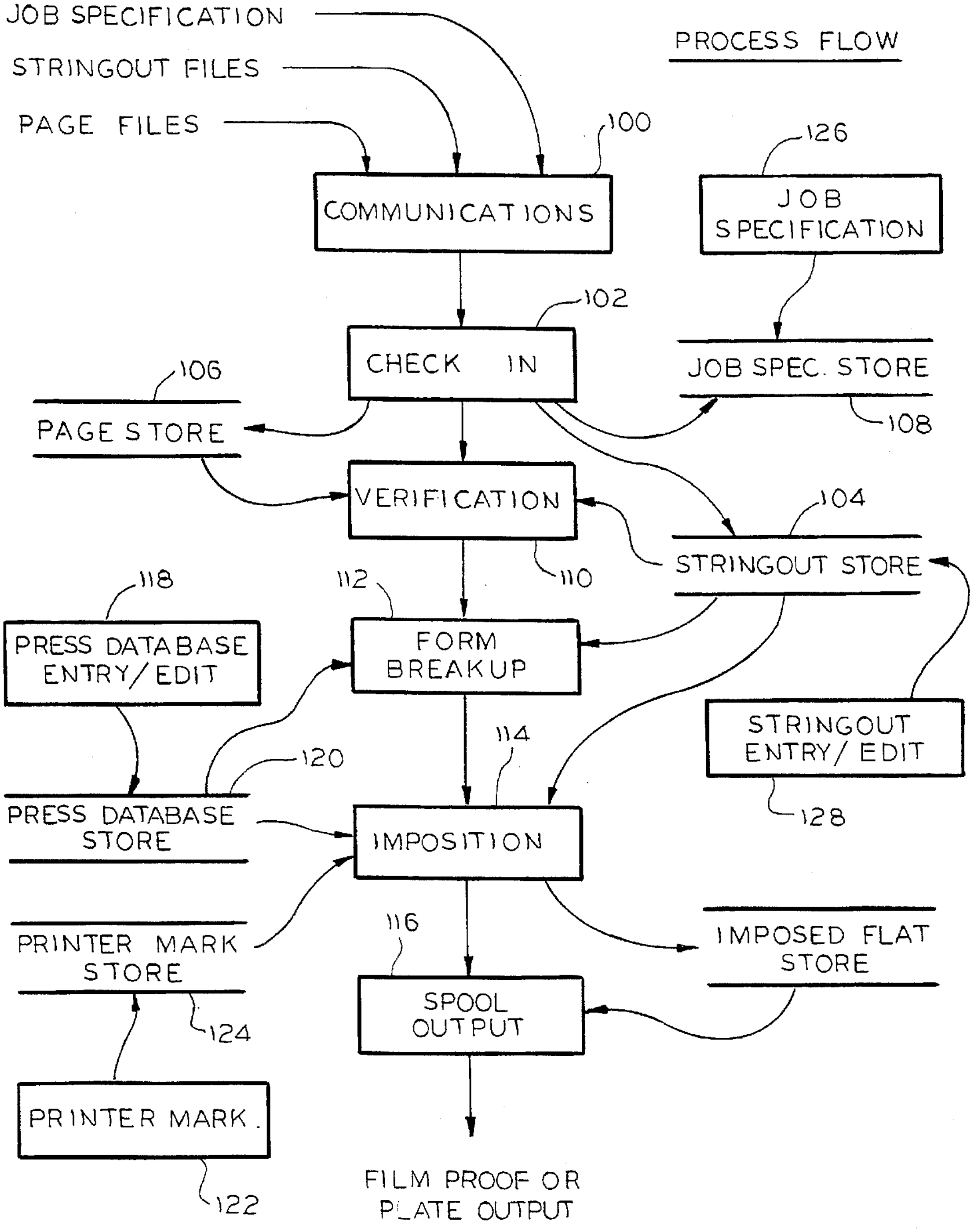
FIG. 3 is a process flow diagram illustrating the various software modules used by the CPU of FIG. 2.
Figure 11:
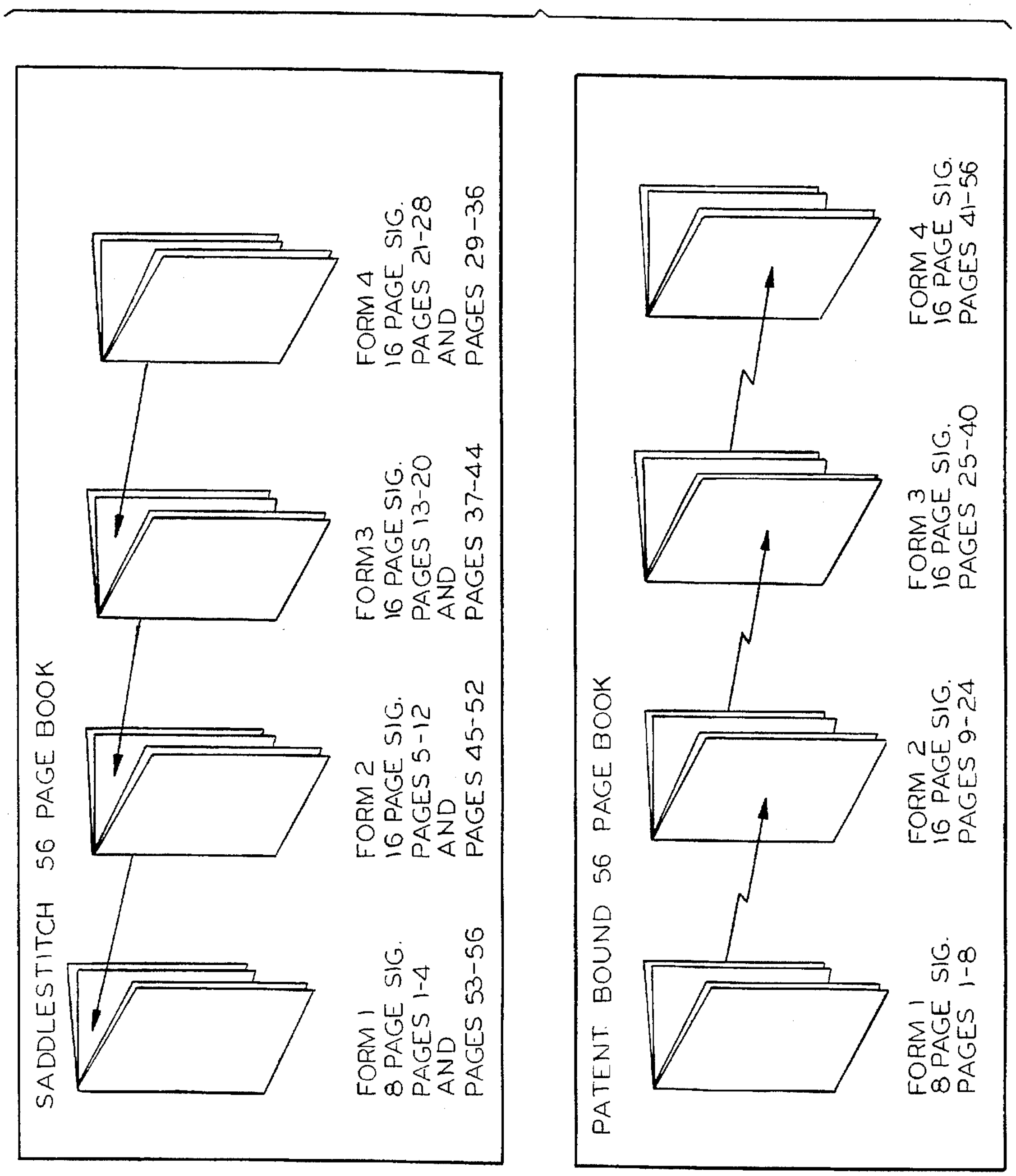
Figure 12A:
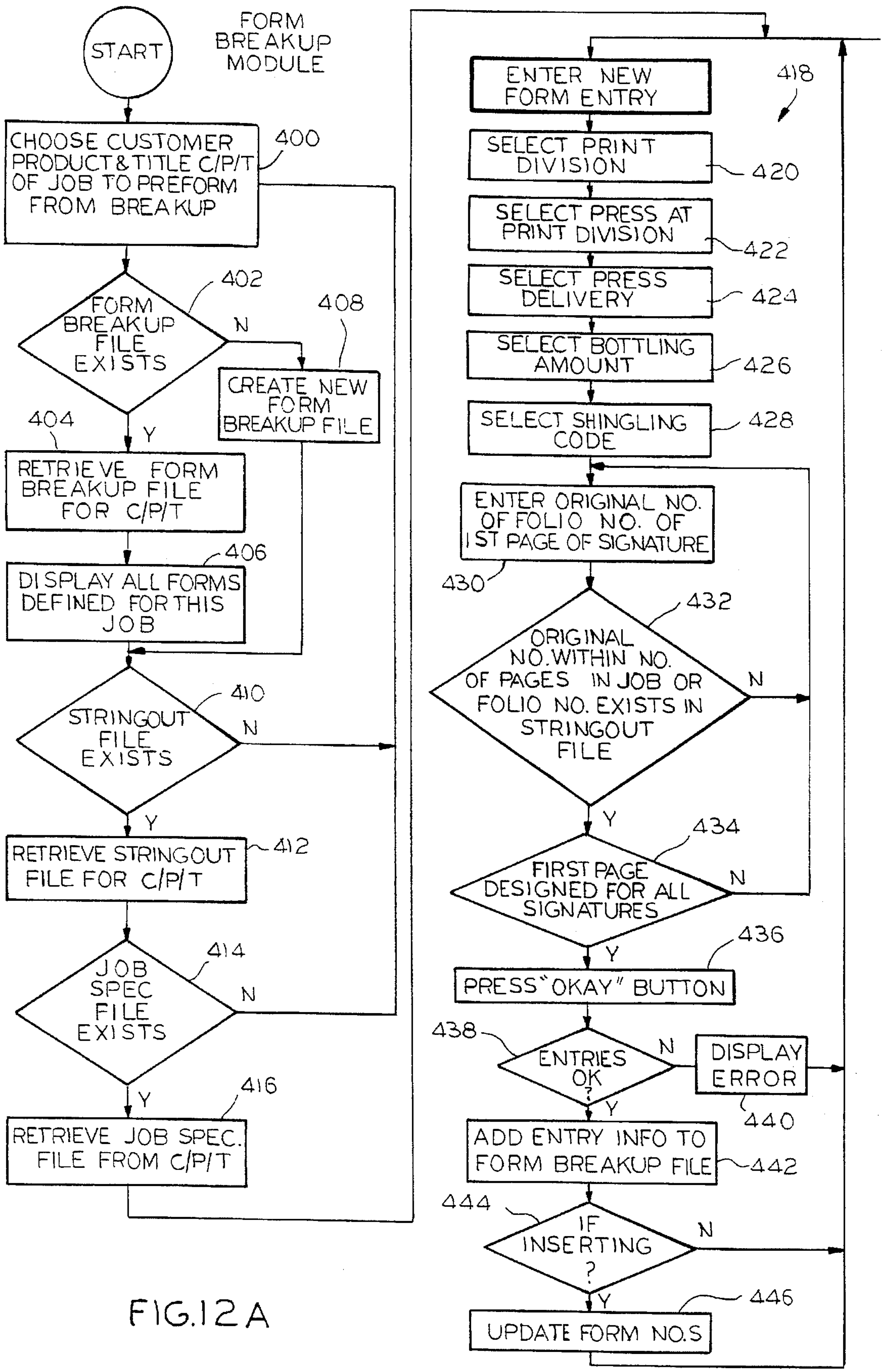
Figure 12B:
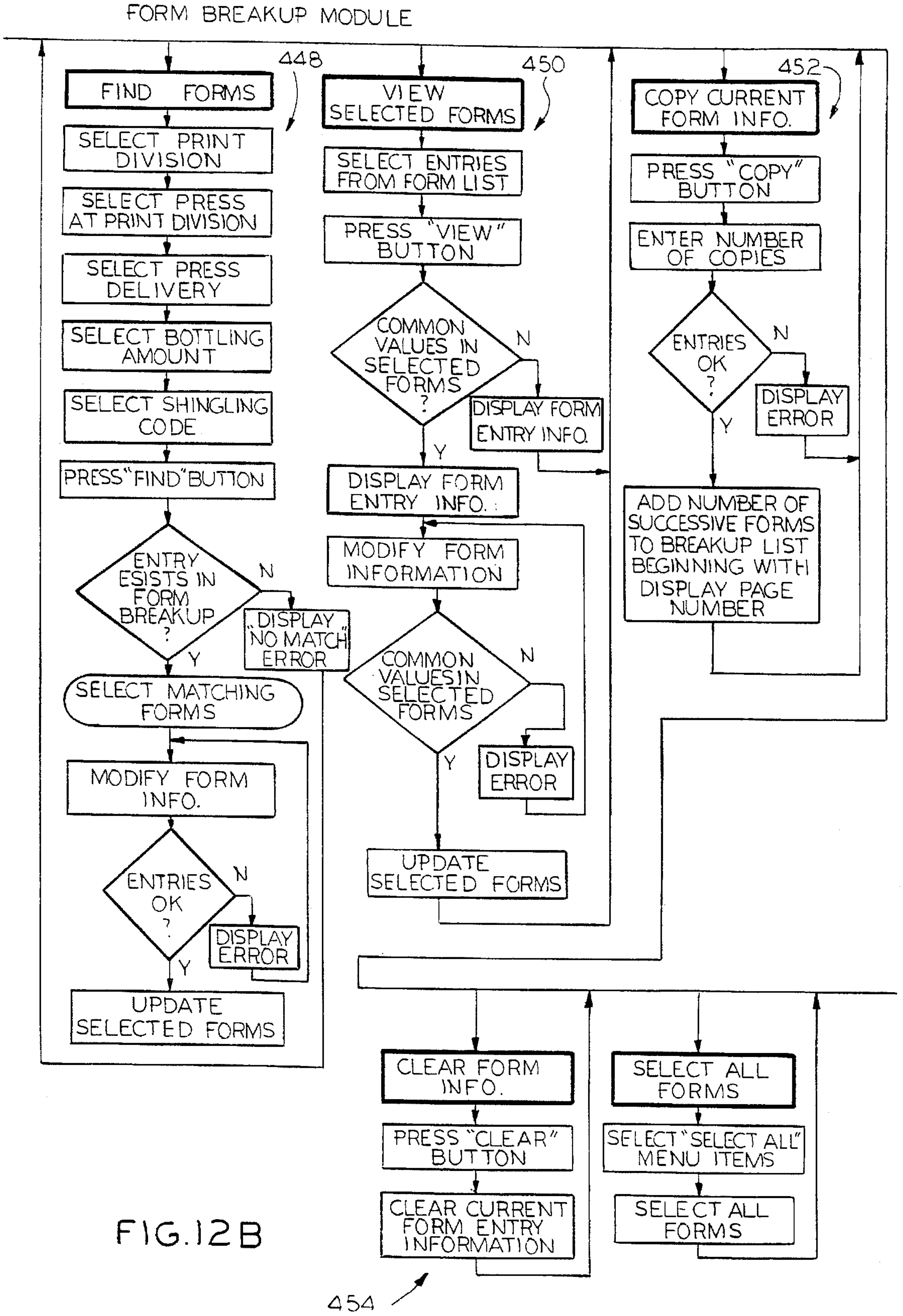
Figure 12C:
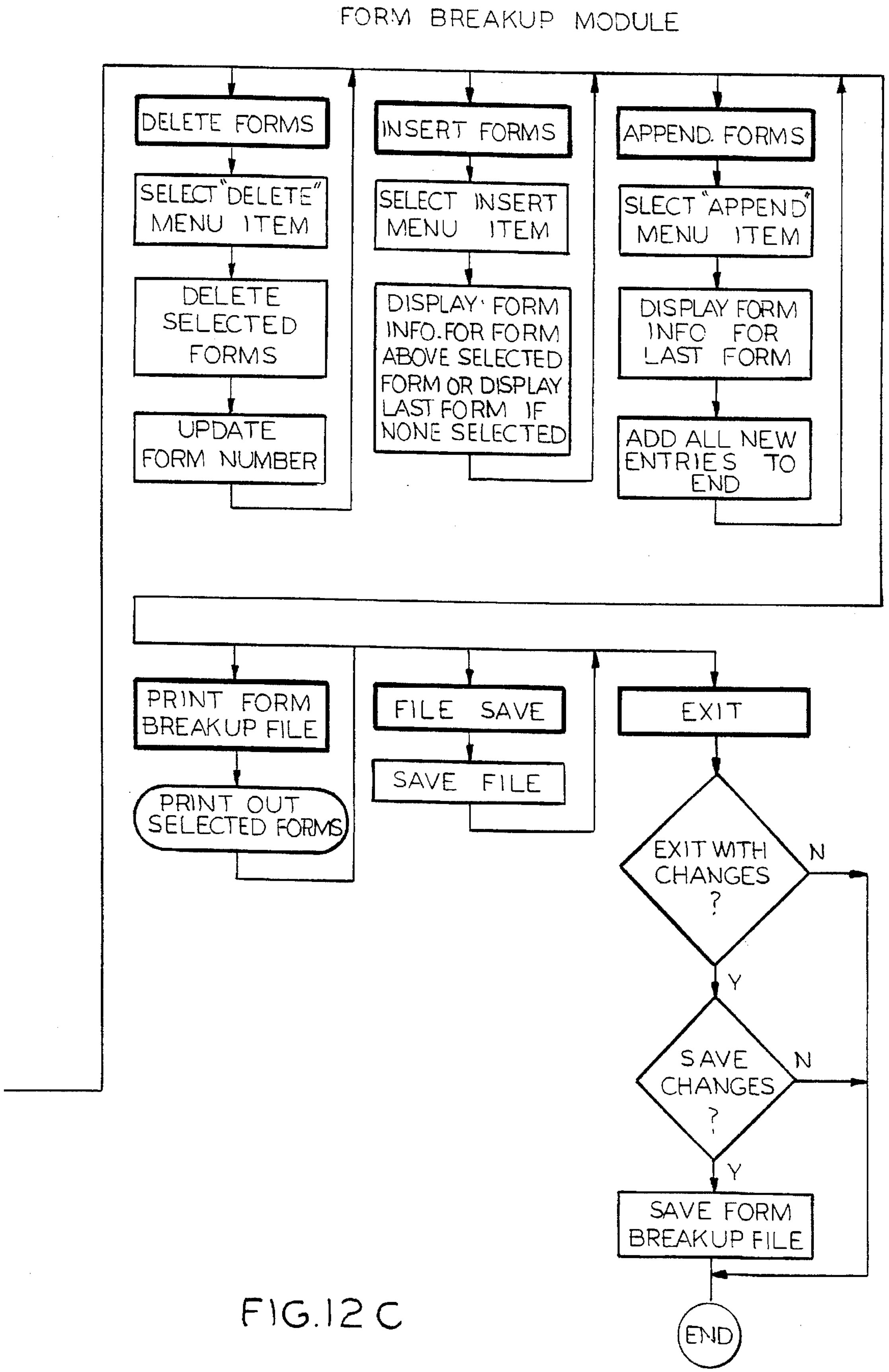
Figure 13:
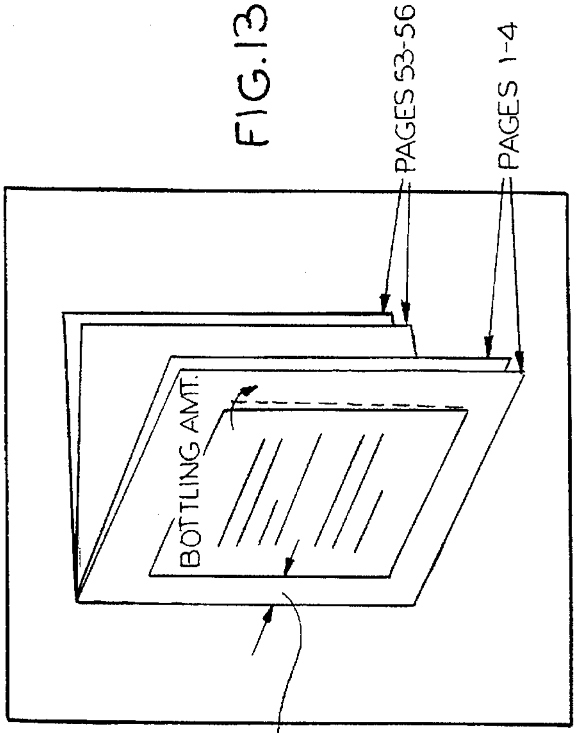

Pig. 10 is a graphic which functionally illustrates operation of the verify module of FIGS. 9A–9E;

FIG. 11 illustrates various formats used for assembling a final book;

FIG. 12A–12C comprise a flow diagram illustrating a software implementation for a form breakup module of FIG. 3;

FIG. 13 illustrates a procedure for defining a form for a particular form delivery; and FIG. 14A–14E comprise a flow diagram illustrating a software implementation for an imposition module of FIG. 3.

DETAILED DESCRIPTION OF THE INVENTION

Figure 1:
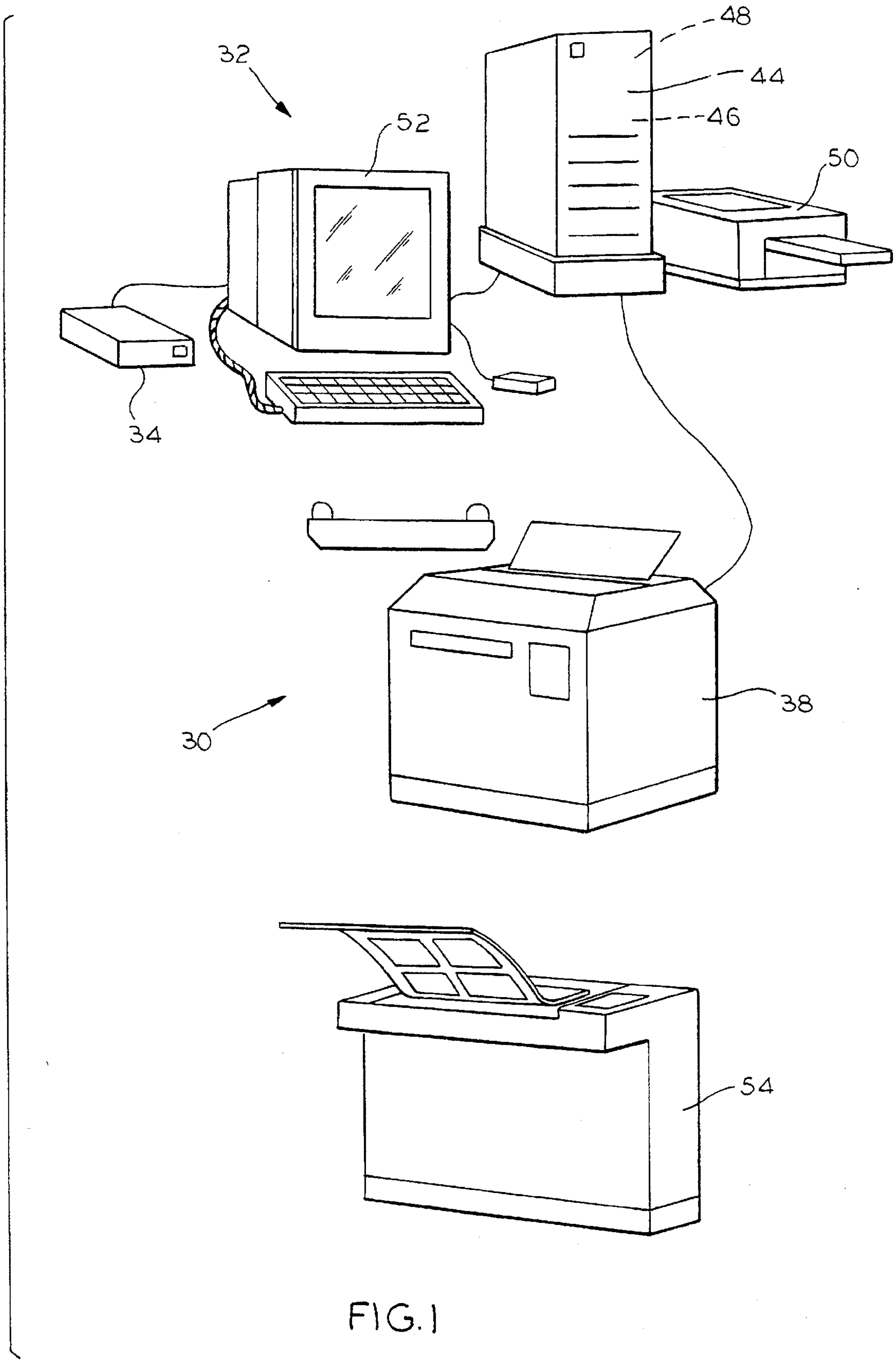
FIG. 1 is a perspective view of hardware used to implement the digital page imaging system according to the invention.
Figure 2:
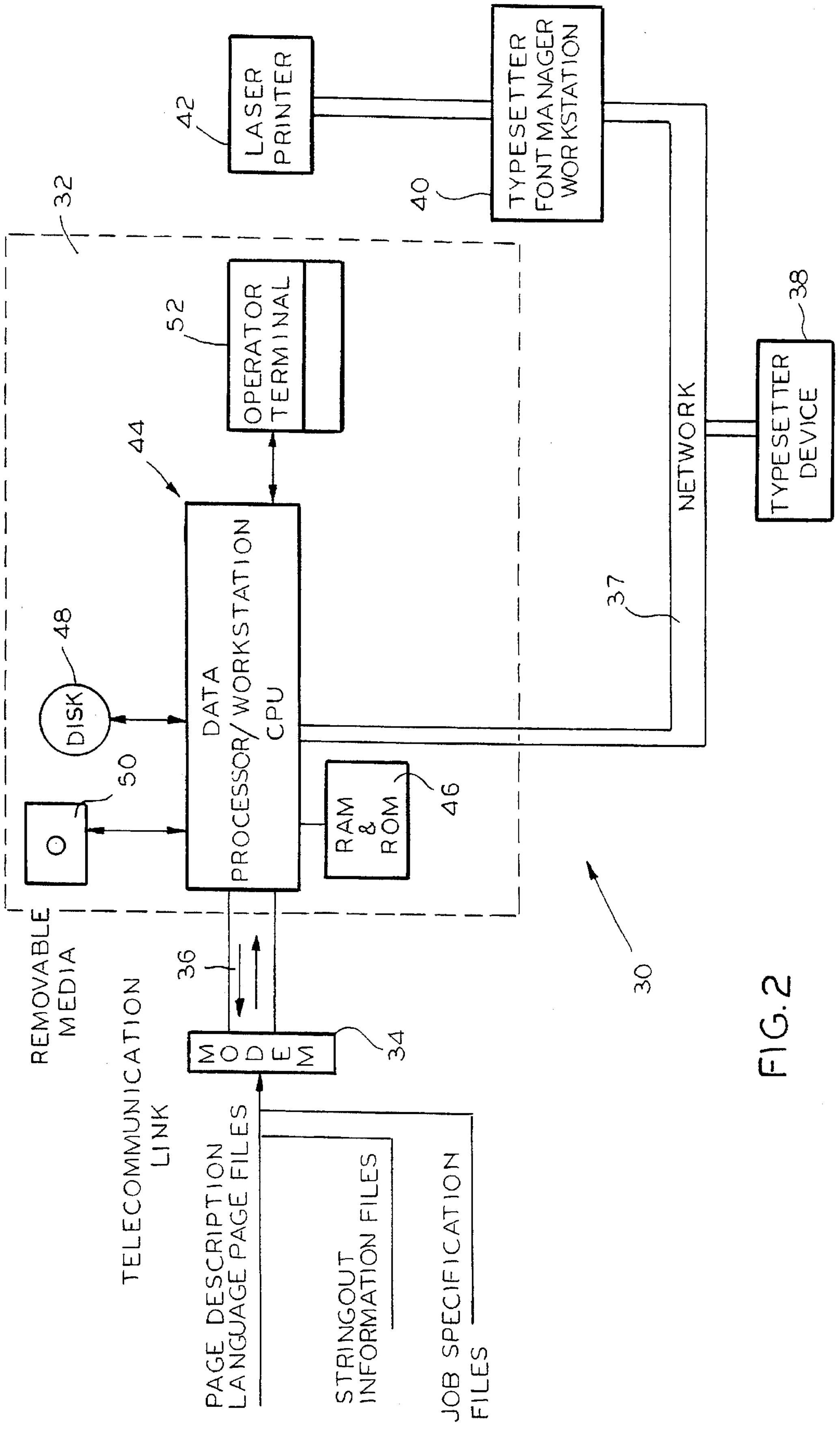
FIG. 2 is a block diagram more particularly illustrating the digital page imaging system according to the invention.

With reference to FIGS. 1 and 2, a digital page imaging (DPI) system 30 according to the invention is illustrated. The DPI system 30 receives customer transmitted technical documents produced on a desktop publishing package and ensures that the documents are produced properly. The system 30 provides an easy to use interface, reduces turnaround time in processing customer work, and eliminates errors associated with manual imposition processes.

From a hardware perspective the DPI system 30 consists of a work station 32, modem 34 and related telecommunication link 36, a photo typesetter 38 and a typesetter manager work station 40. A network 37 interconnects the CPU 44, typesetter manager work station 40 and the typesetter 38. A laser printer 42 is used for proofing, if necessary.

The work station 32 may comprise, for example, a Sun 4/330 work station including a central processing unit (CPU) 44, including associated RAM and ROM memory 46 as is conventional as well as a hard disk 48 and suitable removable media 50, such as floppy disk drives or tape units, as necessary. An operator terminal 52 provides a user interface with the system, as is conventional. The work station 32 provides the overall operator interface to the DPI system 30 and supports communication of data and support files with customers as well as the processing and spooling of output film flats to the typesetter 38. The typesetter 38 may be, for example, a Linotronics L530 photo typesetter. Such a typesetter provides high-resolution options in a range of 635 dots per inch through 1,270 to 2,540. Press film is developed using a developer 54 which prints out press film flats, typically eight, sixteen or twenty-four pages fully imposed and ready for plate making and printing. The laser printer 42, see FIG. 2, provides reduced laser page proofs to provide proofing.

The font manager work station 40 acts primarily as a font downloader to the typesetter 38. It also acts as a gateway between the work station 32 and the laser printer 42 via the network 37.

The typesetter device 38 is a high resolution film output device complete with a raster image processor that accepts flats of pages and produces high resolution film output on its roll-fed film recording device.

To utilize the DPI system 30, customers produce documents on a desktop publishing system creating a set of PostScript® encoded page files (PostScript is a registered trademark of Adobe Systems Incorporated). These encoded page files are thus produced using a page description language format which can be printed out on commercially available printers. From the customer's site, the page files are transmitted on a commercial communications package, such as Blast® telecommunications software (Blast is a registered trademark of Communications Research Group, Inc.) over direct dial-up lines or across an X.25 network. The received files are moved to a directory created for the specific customer, job and title to be produced. A verification of the received files is performed, verifying that the pages sent match the information recorded in the customer's support files. The customer or a DPI operator creates job set-up information for the product, including specifications for impositions such as bottling, shingling and the form breakup for the job. Using the customer supplied pages and support files, along with information concerning the job setup and the press the job will be run on, the pages are imposed, producing a PostScript® file corresponding to a film flat.

The imposed film flat is spooled to either a laser proofer 42 for a visual check or to the typesetter 38. Both the laser printer 42 and the typesetter 38 have a front end PostScript® raster image processor which converts the code into a bit map, which can then be used to image the imposed flats on paper or film. The film flats produced consist of a number of pages, appropriately positioned and rotated, along with the appropriate printer's marks. The film is then used to produce offset plates that are used to run the job on a press.

The following is a list of definitions of terms used throughout herein and which may be referred to as necessary.

Bottling

A small angle rotation on a page during the imposition process to compensate for folding when the job is printed. The bottling anchor position is the single point on the page which will not be affected by bottling, but which will be used as the center of the rotation.

Delivery

The set of signatures coming off a press folder during a single press run.

Flat

The layout of several imposed pages the way that they will appear on a plate, rotated and positioned properly to take into account shingling, bottling and folding characteristics. Each flat consists of one color, one side and one web of one form. This term may also be used to denote the PostScript® files which, when sent to a PostScript output device, will cause a flat to be printed.

Flat Spooling

The process of sending one or more flat images to an output device, including the queuing and buffering of flat data for consecutive output requests.

Folio

A page identification.

Form

The set of all pages which are on a press at a given time.

FormBreakup

A definition of the way that pages in a job are to be divided among the possible deliveries on the press or presses on which a job is to run.

Imposition

The set of pages on a particular plate, as well as their positioning and orientation on the plate.

Job Specifications

Specifications that must be provided for each job that detail how to print and bind the job.

Ordinal Number

This is an indication of the order that the page occurs in the job.

Printers Marks (Press Marks)

Marks which are placed on plates in accordance with quality practices to assist in the stripping, collating and folding of a printed document.

Printing Unit

The part of a press which puts ink on paper. A press may have several printing units, each of which may produce a different color.

Shingling

Shifting a page horizontally or vertically during the imposition process to compensate for folding when the job is printed.

Signature

A printed and folded sheet which forms a section of multiple pages for a book.

Stringout

A list of folios and colors on individual pages in a job.

Template

The PostScript code used to print a flat which does not include the actual page images. This can be thought of as a skeleton flat into which individual pages can be placed.

Tiling

Breaking a plate into two or more separate film flats so that it can be imaged on an imagesetter whose output is of fixed width. Individual tiles must be put together prior to making plates for the flat.

With reference to FIG. 3, a process flow diagram illustrates the software modules used by the DPI system 30. The modules are shown with arrows interconnecting other modules. These arrows illustrate logical use of the modules by an operator.

As discussed above, pages from a customer in electronic page description format enter the system electronically via a telecommunications link 36, see FIG. 2. Optionally, the data could enter through some other form of electronic media, such as floppy disk or magnetic tape 50. A communications module 100 logs on a specific customer to the work station 32 into its respective user account and automates the transmission of data files at both the transmit and receive sites. The communications module assures that all data files are properly received without any errors, and places all files into a receive directory under the customer's user account. In addition to the page files, the customer may also transmit string out information files and job specification files. The job specification files relate to job specific parameters for the particular job to be processed including information detailing the number of pages, margin sizes, trim and untrim page sizes, horizontal and vertical page offsets, collating marks, and other job related parameters. The stringout file, also known as a collation file, provides an identification to the system as to where each page in the page file is located.

A check-in module 102 processes the data files received. There will exist a one-to-one correspondence between stringout files received and jobs sent from a remote site to the DPI system 30. Each stringout file indicates the file name and file position for each page in the corresponding job. The check-in module 102 processes each stringout file received, locating the files containing the job pages and placing these files as at 104 in a unique directory for the specified job. When the check-in module 102 is completed, a directory will exist for each job received, with all the page files stored in the appropriate directory, as at 106. Similarly, the job specification data, if available, is stored as at 108. As will be appreciated, all of the data files 104, 106 and 108 are typically stored in the disk 48.

A verification module 110 is used for each job received. The verification module 110 ascertains whether all pages for the job are included in the appropriate directory created by the check-in module 102. The verification module 110 also verifies that fonts specified in the pages are available at the printing site and that color separations for pages specified in the stringout file are present. The verification module 110 also performs a preprocessing filter function which alters the incoming files to match a standard protocol page description language format, applying different filters depending upon the commercial publishing package used to create the pages.

A form breakup module 112 enables the operator to choose the forms, corresponding to the various press deliveries described in the press database, discussed below, that will be used to print the job. The form breakup module 112 automates the process of selecting ordinal/folio offset portions within the book, automatically incrementing page position throughout the book as new forms are selected. Calculations are made for both perfect bound and saddlestitch book formats.

The imposition module 114 uses data from the verification and form breakup modules 110 and 112, respectively, to impose incoming pages into a large page description language file used to generate film output to create offset plates or used to drive a direct-to-plate device. A number of files will be produced for the job, corresponding to the offset plates that are required to produce the job.

A spool output module 116 receives the files produced by the imposition module 114 and outputs them to either hard copy proofing device, a film recording device, or a direct-to-plate device, performing color separations on the page data if requested.

A press database entry/edit module 118 is used to enter parameters describing the various press deliveries available at a printing site or at multiple sites. This information details parameters such as form layouts, correct bottling and shingling required to compensate for distortions that occur due to folding of a web of a finite thickness, description of printers' marks, number of printed webs per press and other relevant information for storage as at 120. A printers mark module 120 allows the operator to specify a number of different possible printers' marks to be printed on the imposed press flats. These marks are stored as at 124 to be used by the imposition module 114 in creating the imposed flats, or to specify the shape and location of a printer's mark such as a registration mark.

A job specification module 126 allows the operator to enter in job specific parameters for the job to be processed, in addition to the parameters that the customer optionally provided as at 108. A stringout entry/edit module 128 allows the operator to view and edit the customer supplied stringout file stored at 104. This operation is typically not performed unless there is an indication that an error exists with the stringout file supplied by the customer, or if a stringout file was not supplied.

The DPI system operator interface 52 combines the use of icons and menus for ease of operation. A module is implemented by selecting an icon representing the same, as is conventional, to open the window. Once opened, a menu display is provided for operator input. Within each module routines are provided for entry, editing, copying and clearing a file. The entry routine is typically used the first time that a file is accessed in the module. Thereafter, the file can be selected, or searched for if not known, and edited. The copy routine allows common data to be copied when used in multiple files, while the clear routine erases responses entered on a menu screen.

As discussed above, the communications module 100 can be accessed by a customer from a remote site to transfer page files, stringout files and job specification files to the DPI system 30. The check-in module 102 enables the operator to move the received files for the given product from a customer receive queue into a correct customer/product/title (CPT) directory in order to make the files available for the remaining modules. If a stringout file exists for the job, then the check-in module 102 filters through the file extracting the file names and copies the files to the CPT directory. Otherwise, the module 102 allows the operator to choose which files are copied. As also discussed above, the stringout file provides a map of the pages used by the rest of the system.

In order to produce the correct film flat, the imposition module 114 needs to know various parameters about the job, such as binding style and trim size. Ideally, this information is received from the customer in the job specification file. If not, then the operator invokes the job specification module 126 to allow this information to be entered or edited, as necessary. In the job specification module 126, the operator will be able to input or edit data for the following parameters:

| | |
|---|---|
| Name of Customer | Left Hand Page Horizontal |
| Product Name | Offset |
| Title Name | Right Hand Page |
| Product ID | Horizontal |
| Title ID | Offset |
| PostScript Format | Vertical Offset |
| Job Number | Minimum Shingling Amount |
| AIT Number | Maximum Shingling Amount |
| Part Number | Units |
| Link to Comment File | Binding Style |
| Number of Pages in the Job | Image Resolution |
| Untrim Width | Need for Collating Marks |
| Untrim Length | Shingling Increment |
| Trim Width | Override |
| Trim Length | Number of Pages per Inch |
| Top, Bottom, Fore and Back Margins | Basis Weight |

The press database module 118 is used to enter all the information that is necessary to describe a new press delivery or to make changes to an existing press delivery. The imposition module 114 uses this information to accurately position pages and the appropriate printer's marks on a film flat.

There are five types of information that are entered using the press database module 118, namely delivery information, signature information, printer's mark information, page information and press information. Together, this information provides a description of the press delivery that the imposition module 114 can use to create a film flat.

Figures 1, 4A:
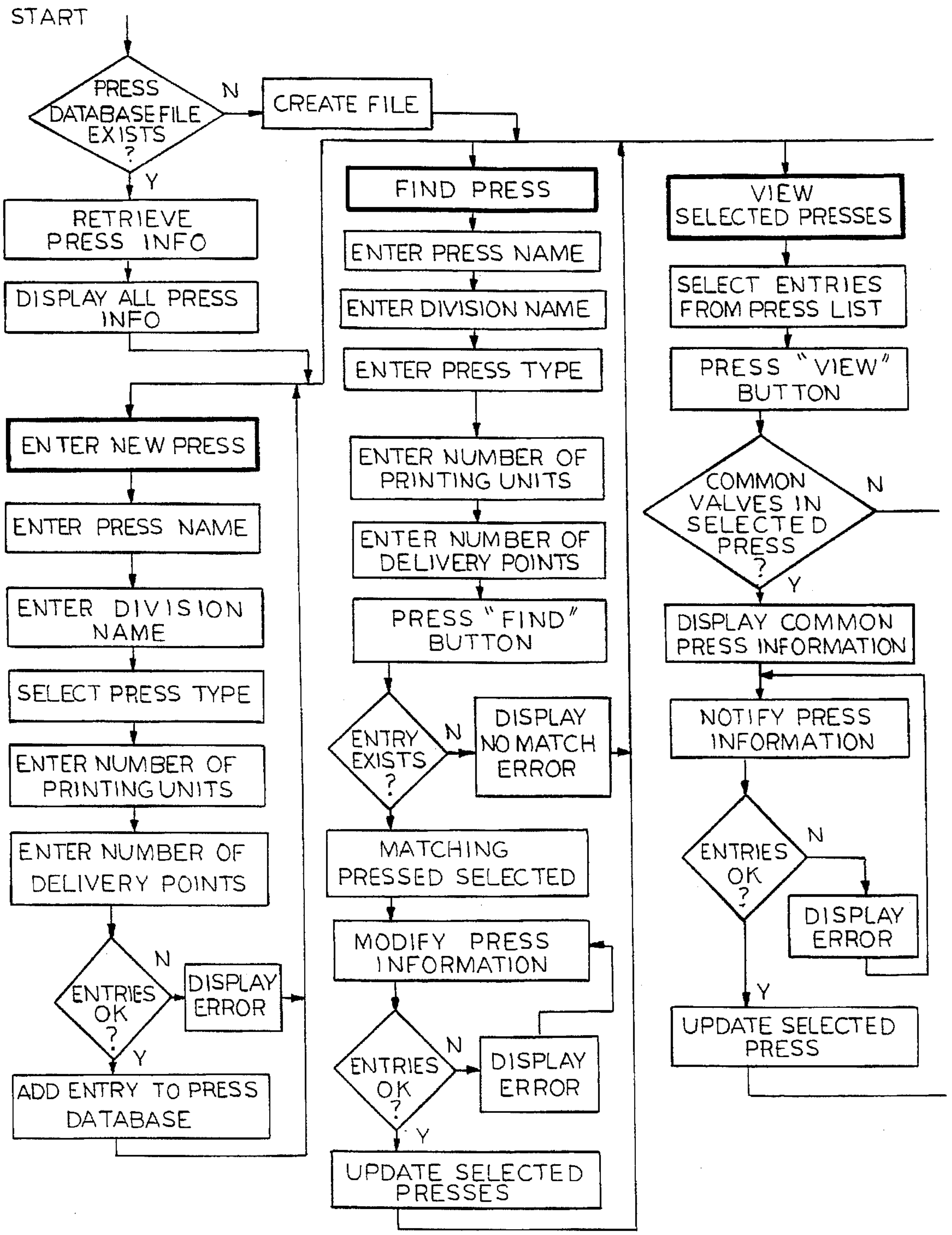
Figures 2, 4A:
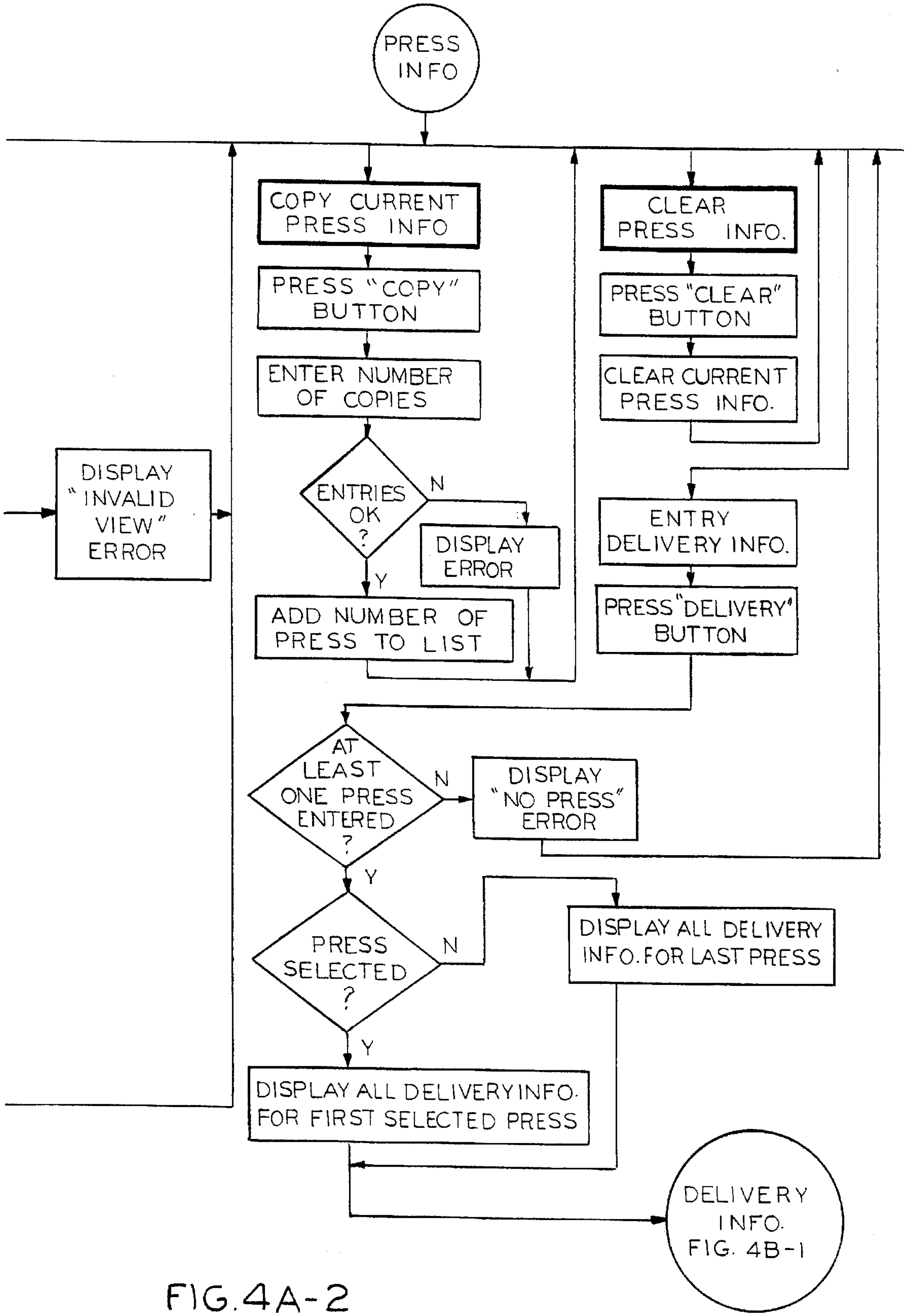
Figures 1, 4B:
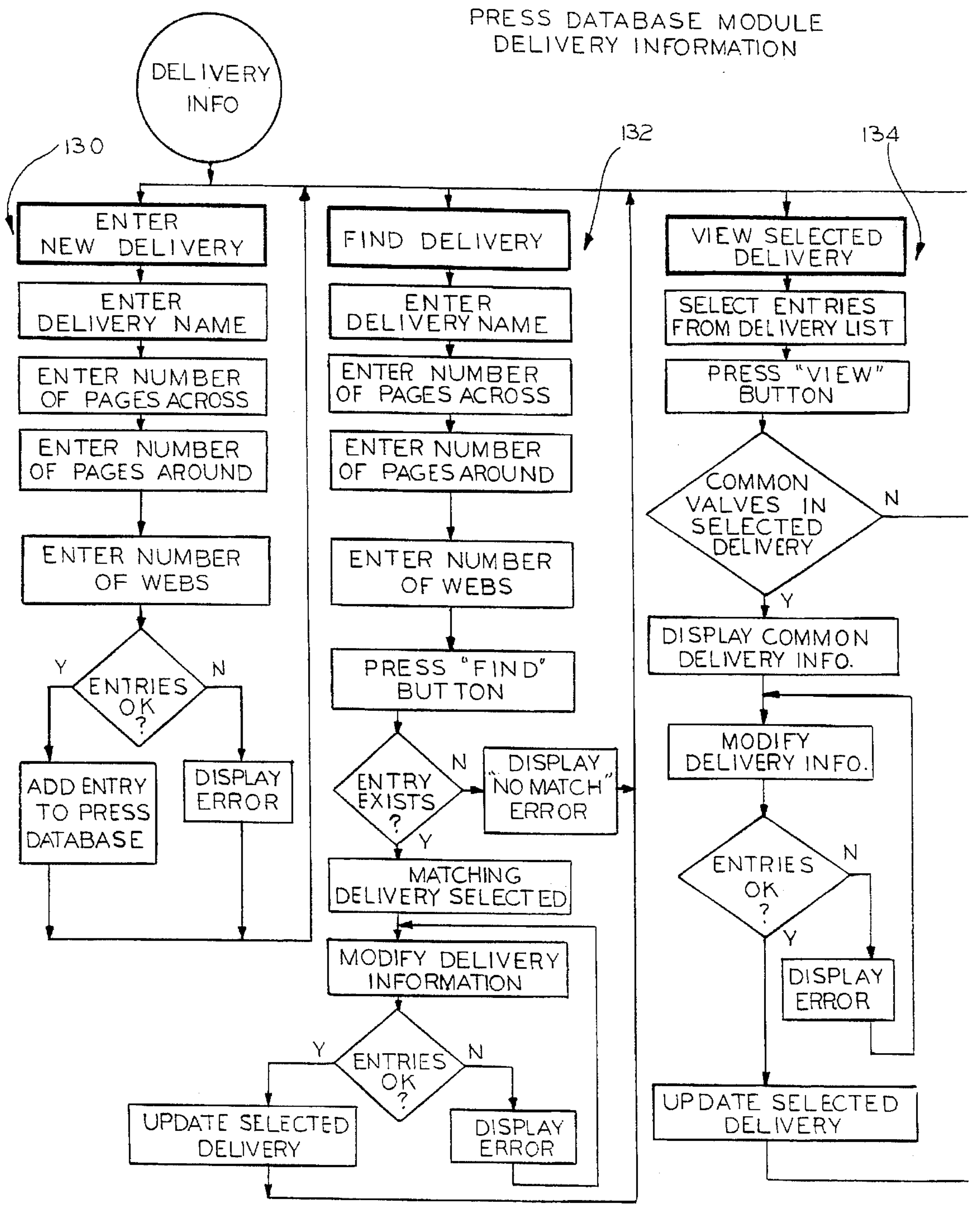
Figures 2, 4B:
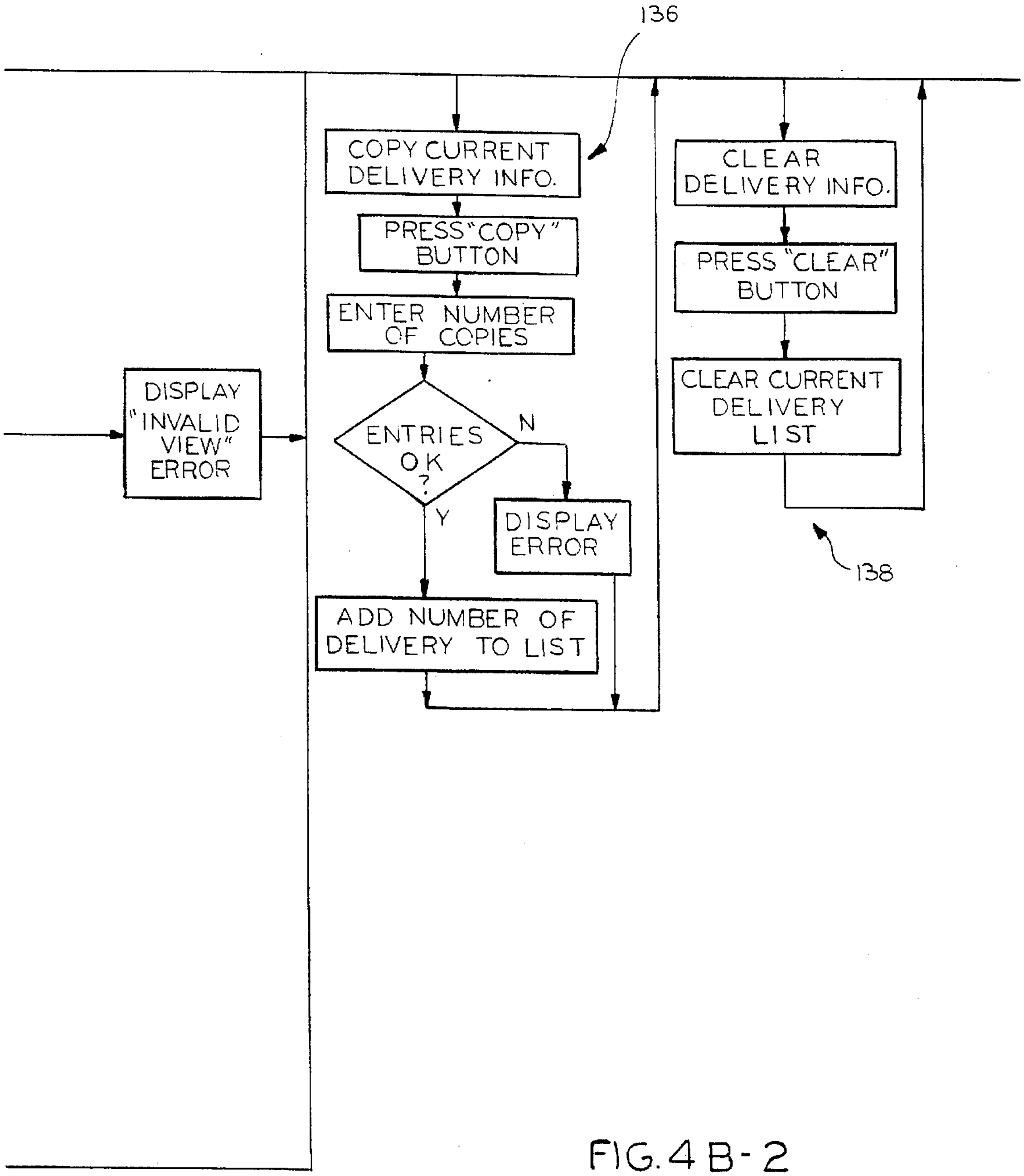
Figures 1, 4C:
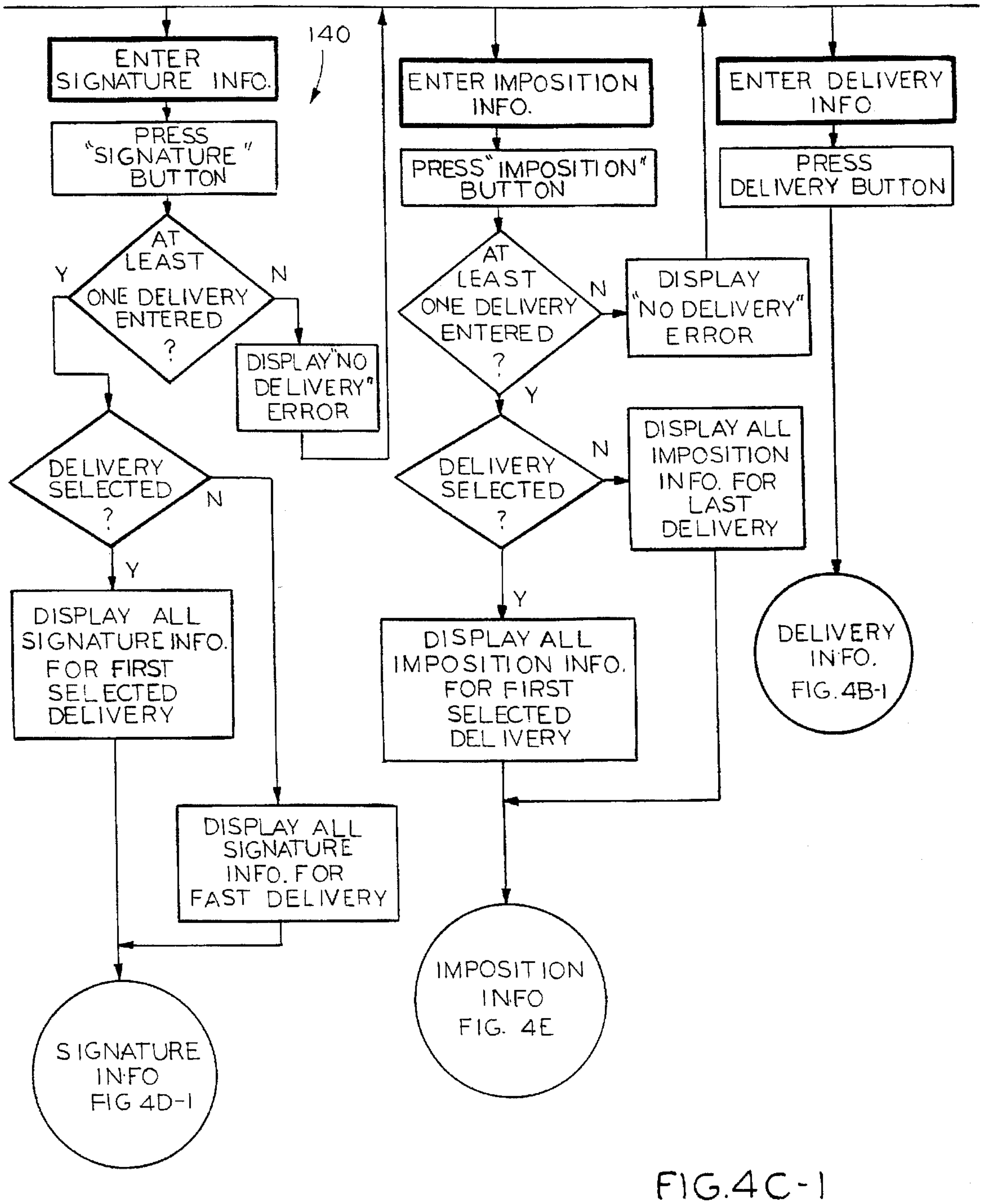
Figures 2, 4C:
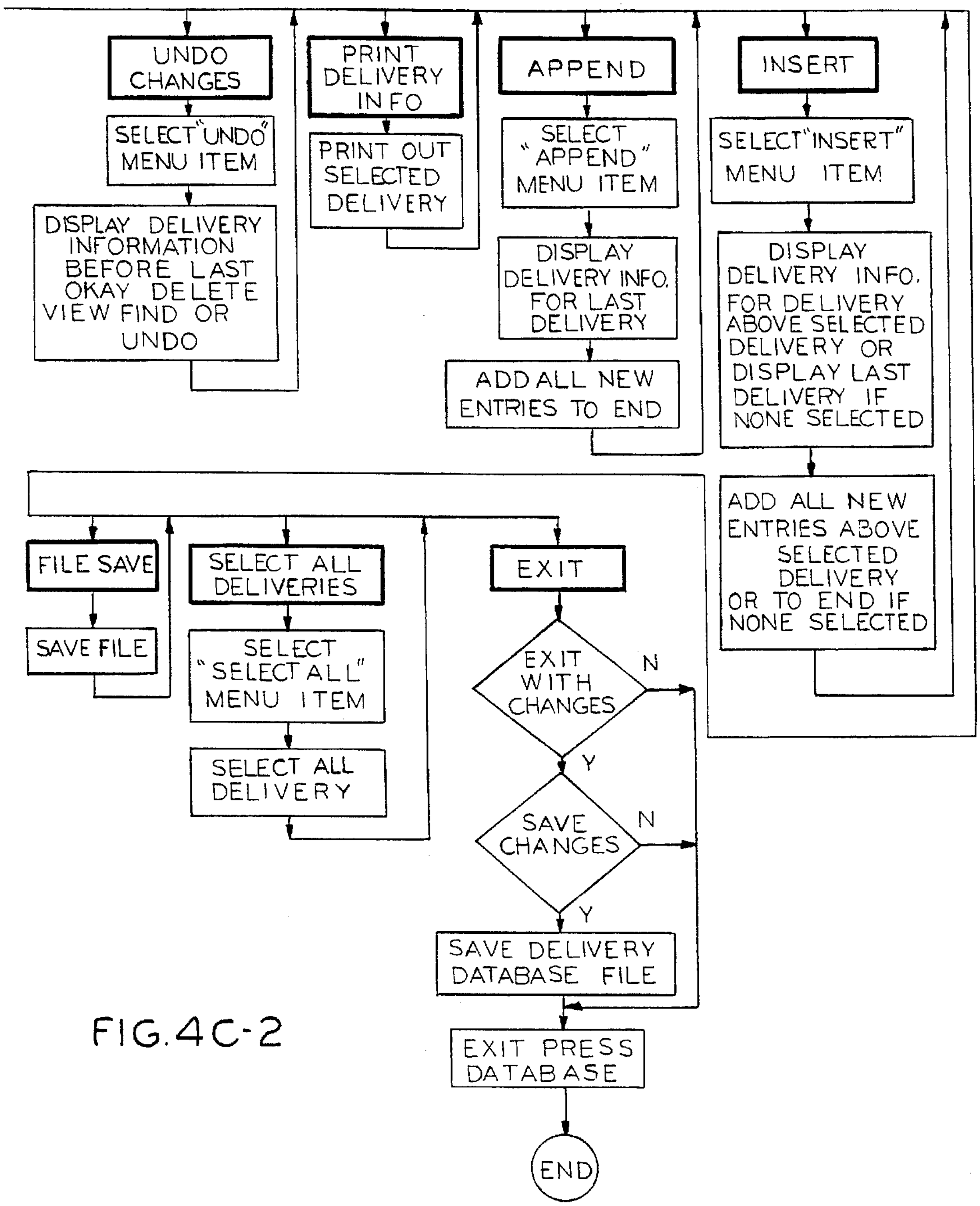

To enter the appropriate press information, a press database icon is selected. From this, the operator can enter a press name and location as well as press type, number of printing units and delivery points, as shown in the flow chart of FIGS. 4A-1 and 4A-2. For example, the press type may be sheet offset, web offset, etc. In the flow charts, the blocks in dark outline across the top represent user selectable routines discussed above, which proceed to unique flow paths. For example, for each such block a user can press a function key or an appropriate icon which results in implementation of the selected routine.

Once the press is selected, the operator can advance to a delivery information routine illustrated in FIGS. 4B-1, 4B-2, 4C-1, and 4C-2. When information for a new press delivery is being entered, control proceeds to an enter routine 130 requesting the operator to enter the delivery name, number of pages across, number of pages around and number of webs to be used for the job. When completed, the entered information is added to the press database. Thereafter, a find delivery routine 132 can be used to find a particular delivery and edit the same, while a view selected delivery routine 132 can be used to select and modify a particular known delivery. A copy current delivery info routine 136 can be used to copy the delivery information for multiple deliveries, while a clear delivery info routine 138 is used to clear the information entered on a screen.

After a new delivery has been entered, the operator can proceed to return to the press information routine or proceed to enter press mark information, page information or signature information.

Figures 1, 4D:
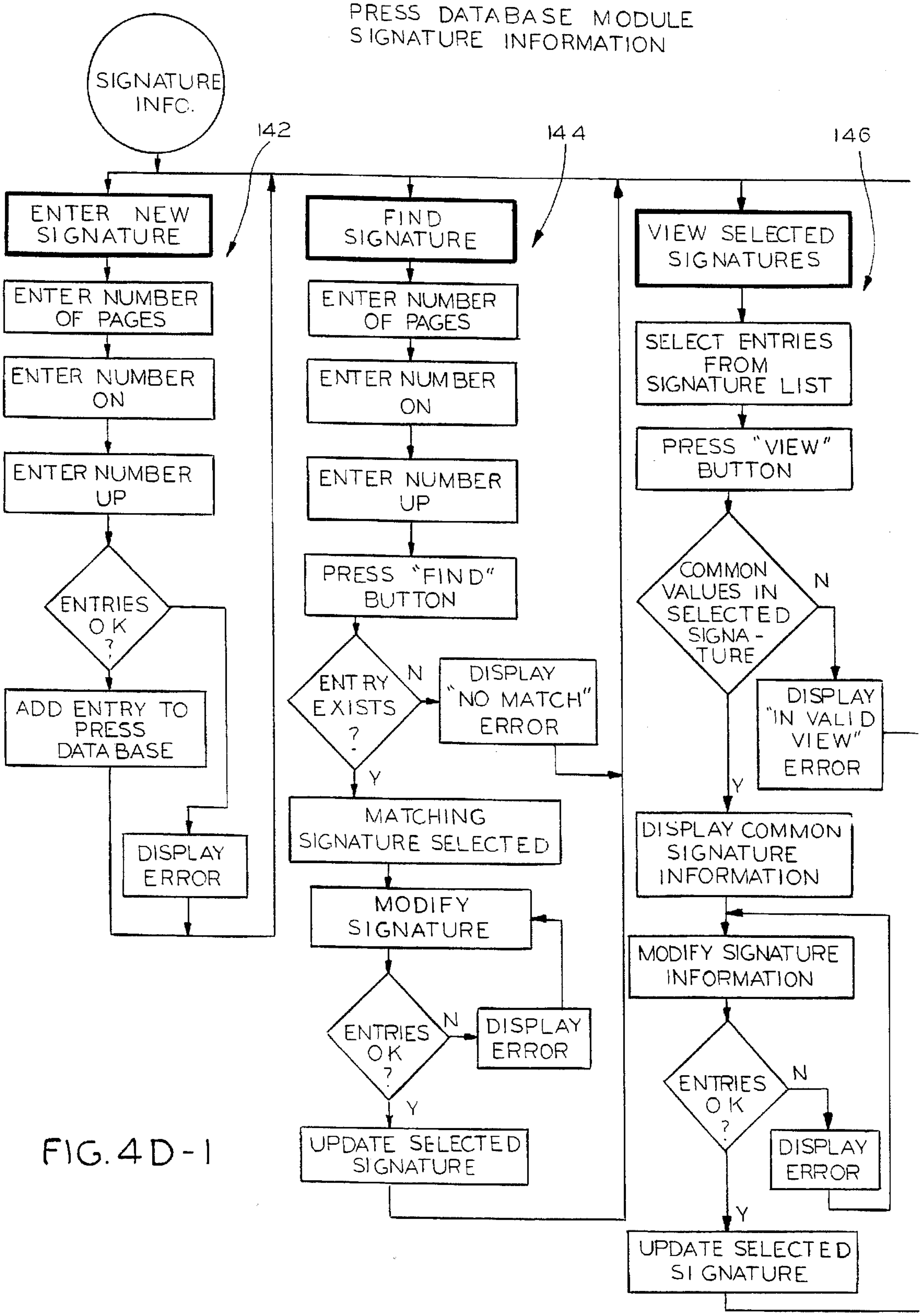
Figures 2, 4D:
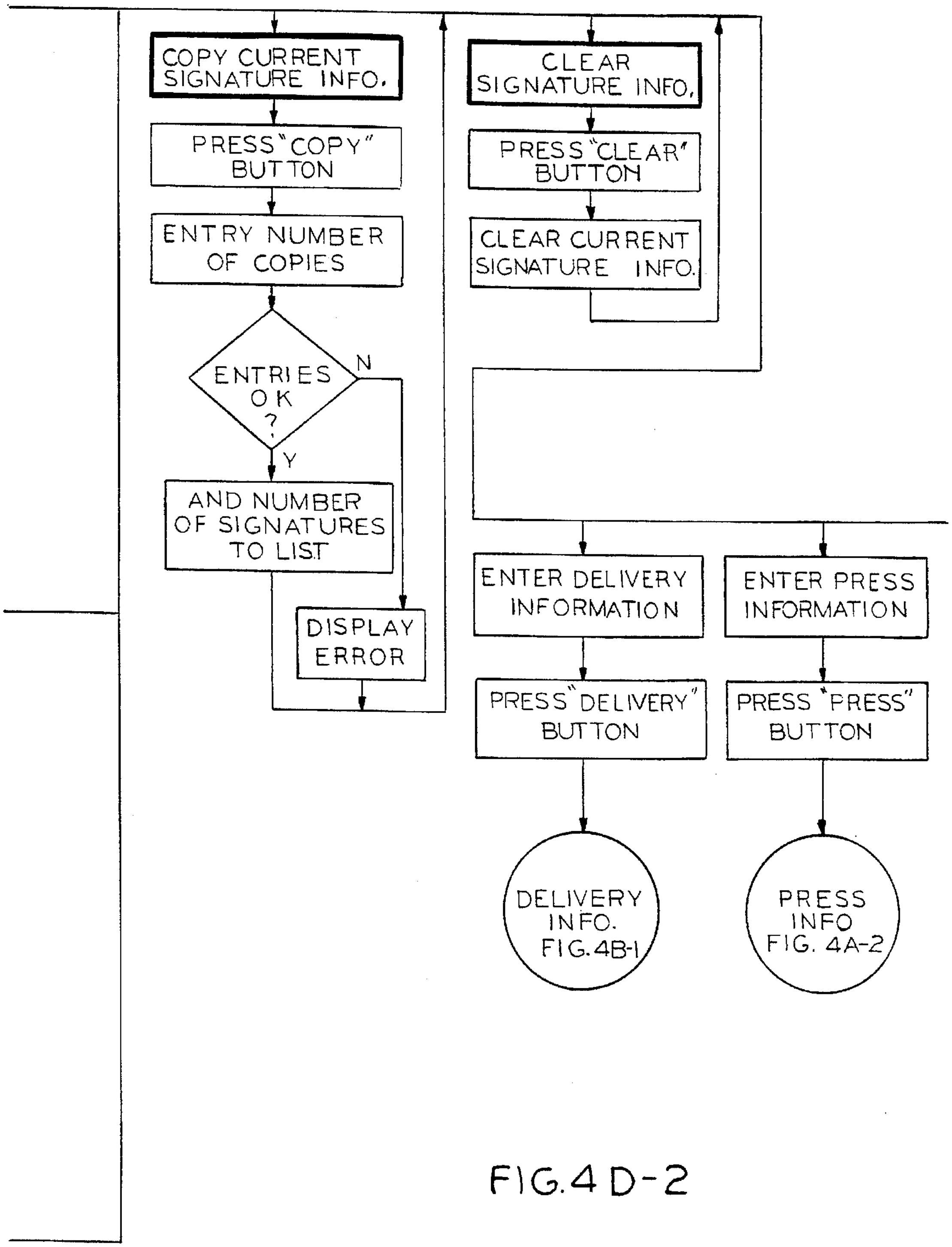

By selecting signature information, a routine 140 is invoked which initially verifies that a delivery has been entered and one selected. Control then advances to the flow chart illustrated in FIGS. 4D-1 and 4D-2.

Initially, an enter new signature routine 142 is begun in which the operator enters the number of pages in the signature, the number on and the number up relating to the particular signature. As with the delivery information, signature information can be modified using find and view routines 144 and 146, respectively. Also, copy signature information and clear signature information routines are provided, as illustrated.

Figure 4E:
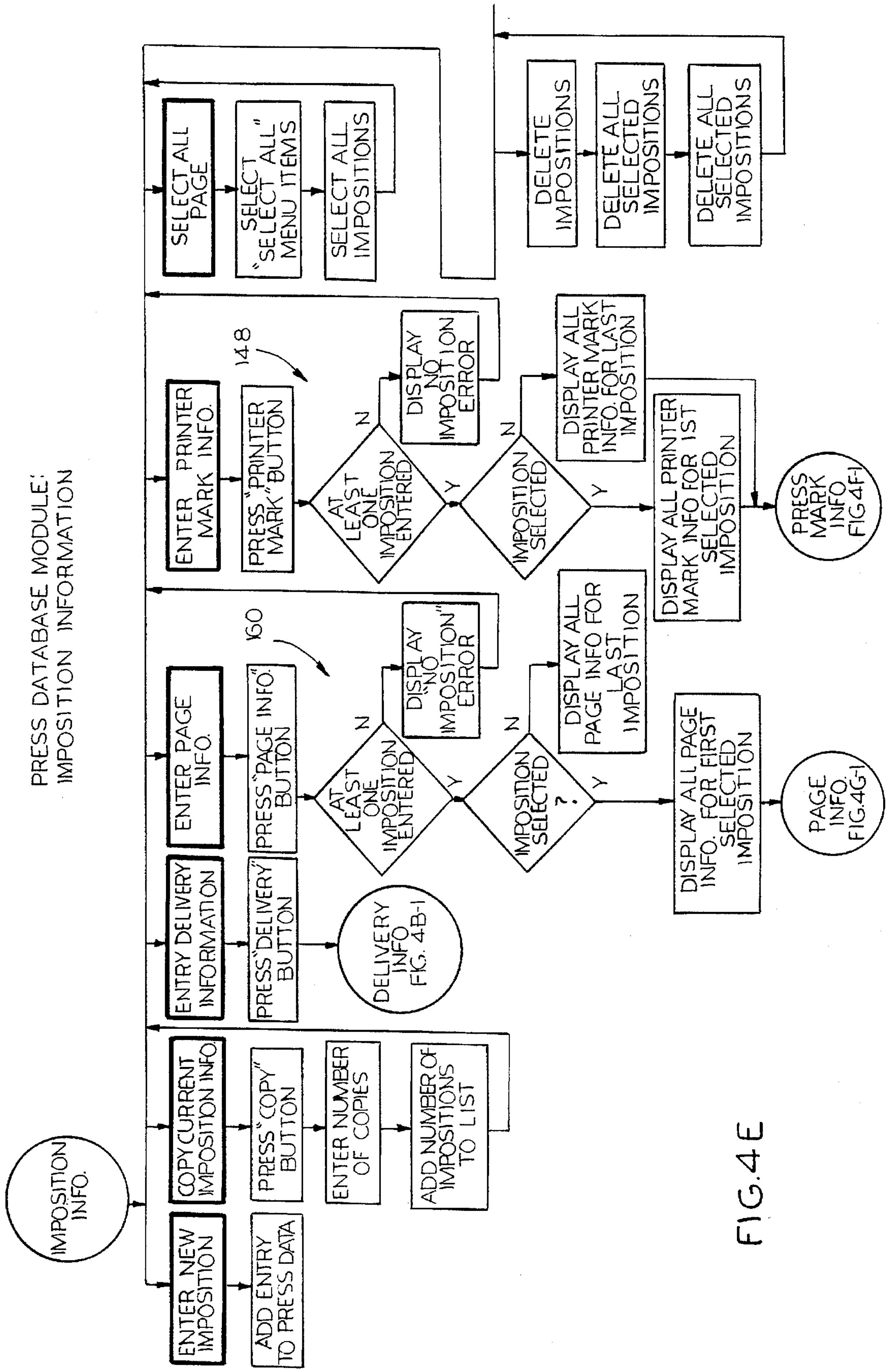
Figures 1, 4F:
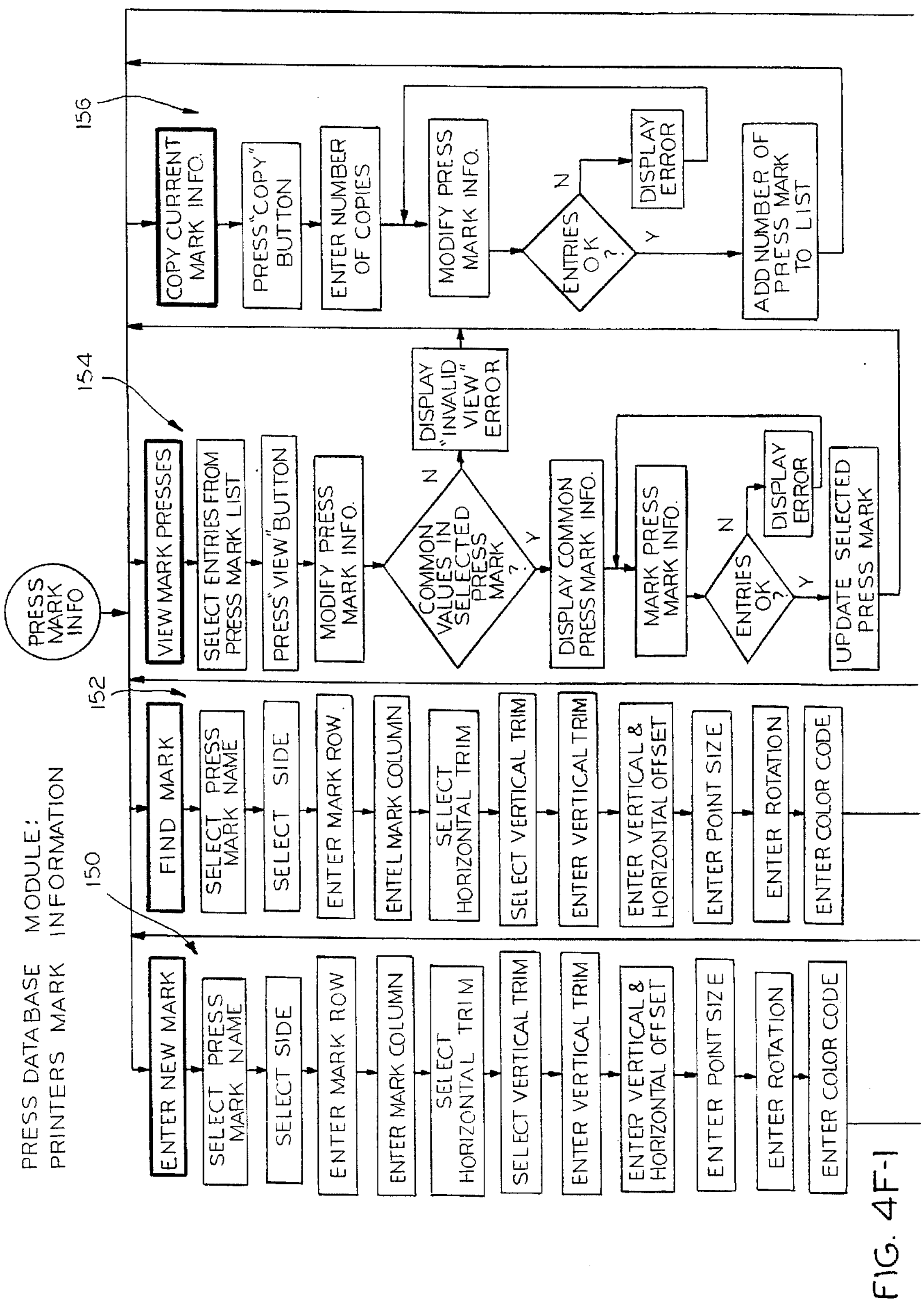
Figures 2, 4F:
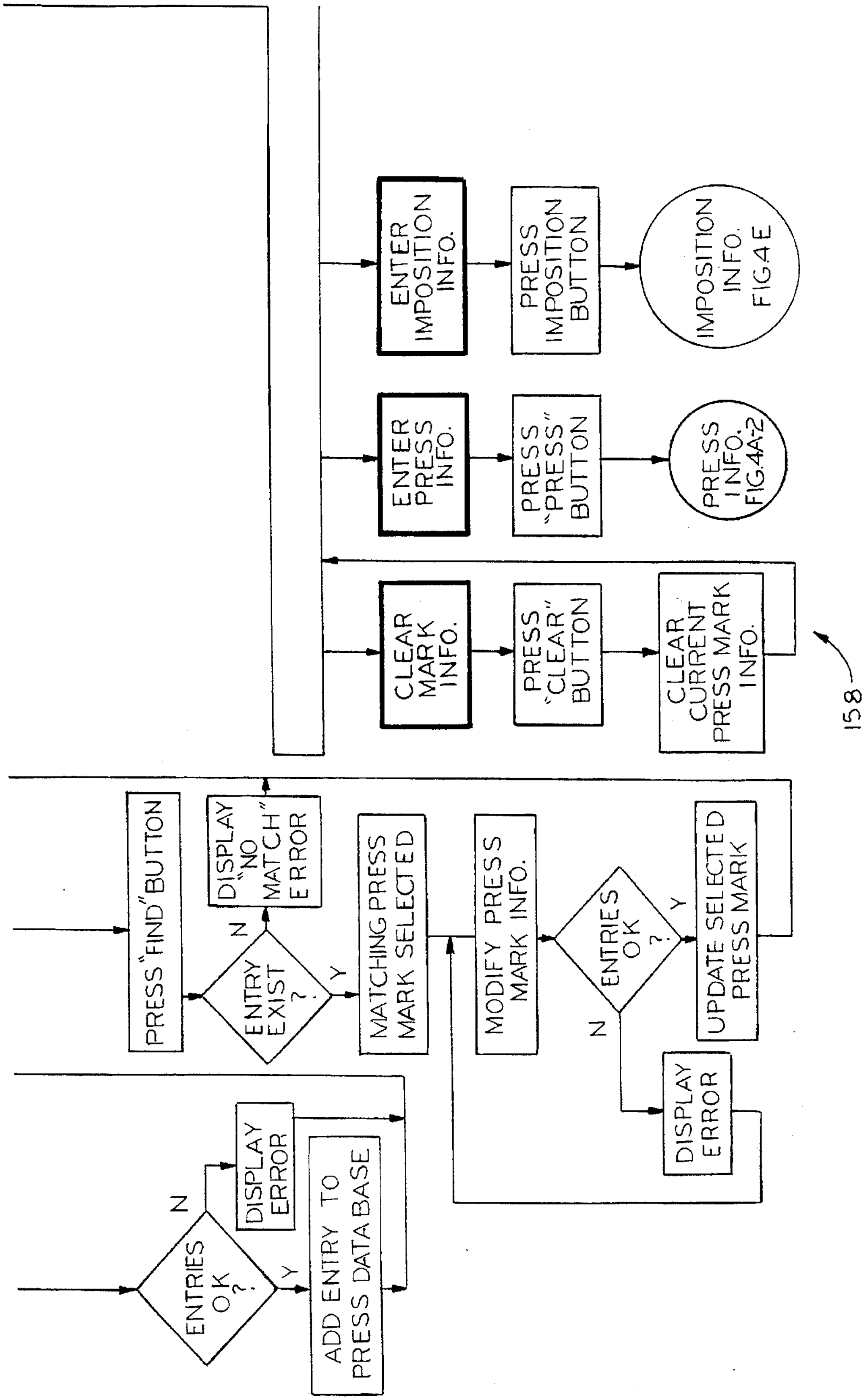
Figure 5:
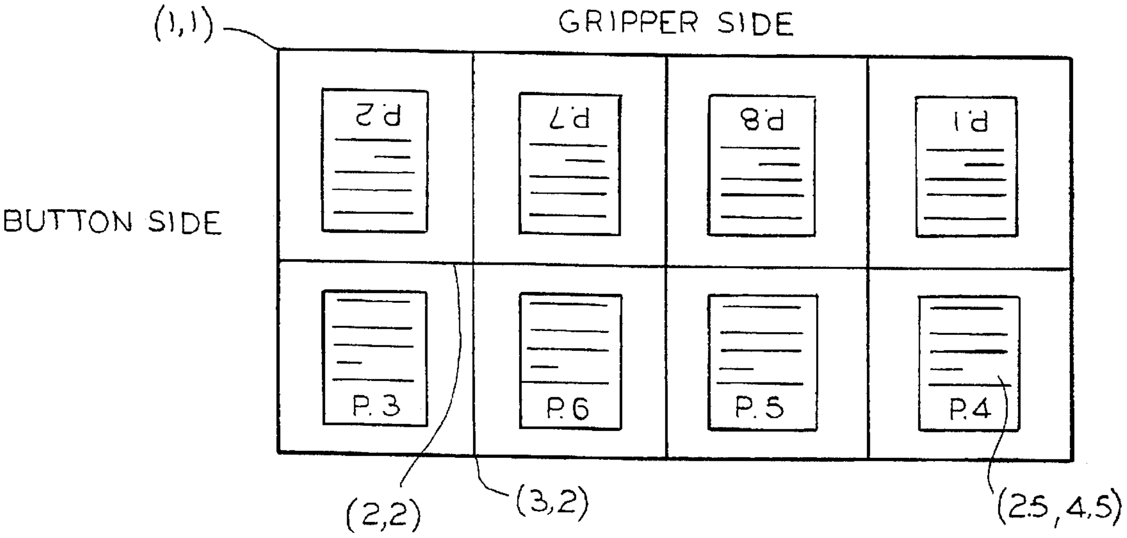
FIG. 5 illustrates one example of an imposed film flat to be produced by the system of FIG. 1.

The remaining steps to provide a description of a press delivery are the printer's mark information and the page information. To do either, it is first necessary to enter delivery information to return to the routine illustrated in FIGS. 4B-1 through 4C-2 from which the operator can request entry of imposition information which proceeds to a flow chart of FIG. 4E to allow the operator to select printers mark information as at 148. This takes the operator to a printers mark information routine illustrated in FIGS. 4F-1 and 4F-2. Initially, control proceeds through a routine 150 for entering a new mark. The printers marks are created in a separate routine and are requested in the press database module for placement on a film flat. For each mark positioned, as shown in the routine 150, the operator chooses the side of the flat the mark should appear on. The side can be front, back or both. The position of the mark on the flat is designated by row and column. A typical eight-page flat is illustrated in FIG. 5. This shows the position of the eight pages relative to the press. The bold lines mark the boundaries of the untrimmed pages and the page-like symbol represents the trimmed pages placed on the flats. The first option in placing printer's marks on a flat is to use the row and column position of the untrimmed pages. As such, the corner of the flat that is on the gripper and button side is the reference position (1,1) indicating the (row, column) position. Each untrimmed page movement away from this reference point increases the corresponding row or column offset amount, as illustrated. The system allows the marks to be placed on the flat using both whole and fractional row and column values, such as the value (2.5,4.5) illustrated overlying page 4 in FIG. 5.

Figure 6:
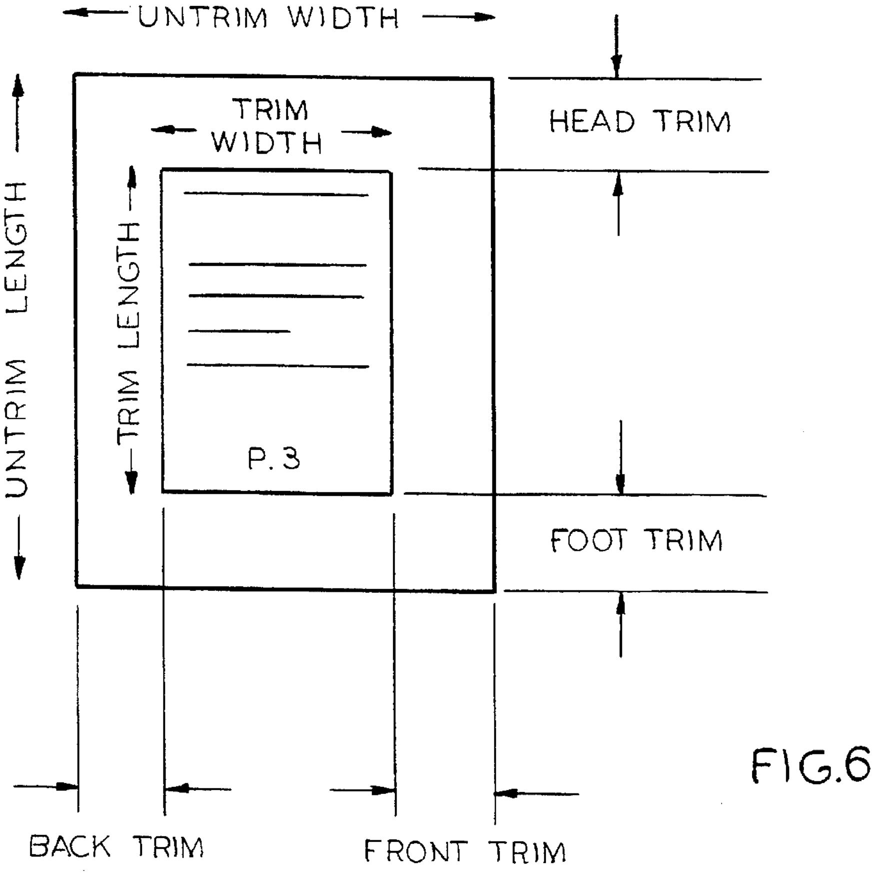
FIG. 6 illustrates a single page for the flat of FIG. 5.

In addition to specifying row and column positions of the printer's marks, an extra offset equal to the horizontal or vertical trim distances can be added to or subtracted from the printer's mark position. With reference to FIG. 6, the "head trim" and "foot trim" are equal to the vertical distances between the trim and untrim pages as shown, while the "front trim" and "back trim" are equal to the horizontal distances between the trim and untrim pages as shown. Using the horizontal trim and vertical trim offsets, a printer's mark can be placed exactly at the corner of the trim page boundaries if desired by using the row and column positions to get to the nearest untrimmed page corner and adding or subtracting the horizontal and vertical trim components as appropriate. Additionally, printer's mark positions can be adjusted by adding additional offsets, measured in points, that can be added or subtracted to the printer's marks position as defined above. This can be used to place a printer's marks a fixed distance away from any position, such as a trimmed page corner.

The size of the printer's marks can be selected by using the size defined in the printer's mark database, by using an absolute override of the size, or using a relative scale factor. Similarly, the amount of rotation can be selected using the specified value, an absolute override or a relative amount to be added to the specified rotation in the printer's mark database. Finally, the color of the mark can be selected. If none is selected, then the mark is placed on all color separations. However, the color must match a color defined in the stringout file when the job is run.

Once the printer's mark information has been entered, then it can be modified using a find routine 152 or a view routine 154. Similarly, the information can be copied or cleared using respective routines 156 and 158. The operator can then return to the press information routine or to enter page information return to the imposition information routine of FIG. 4E from which a routine 160 for entering page information is selected.

Figures 1, 4G:
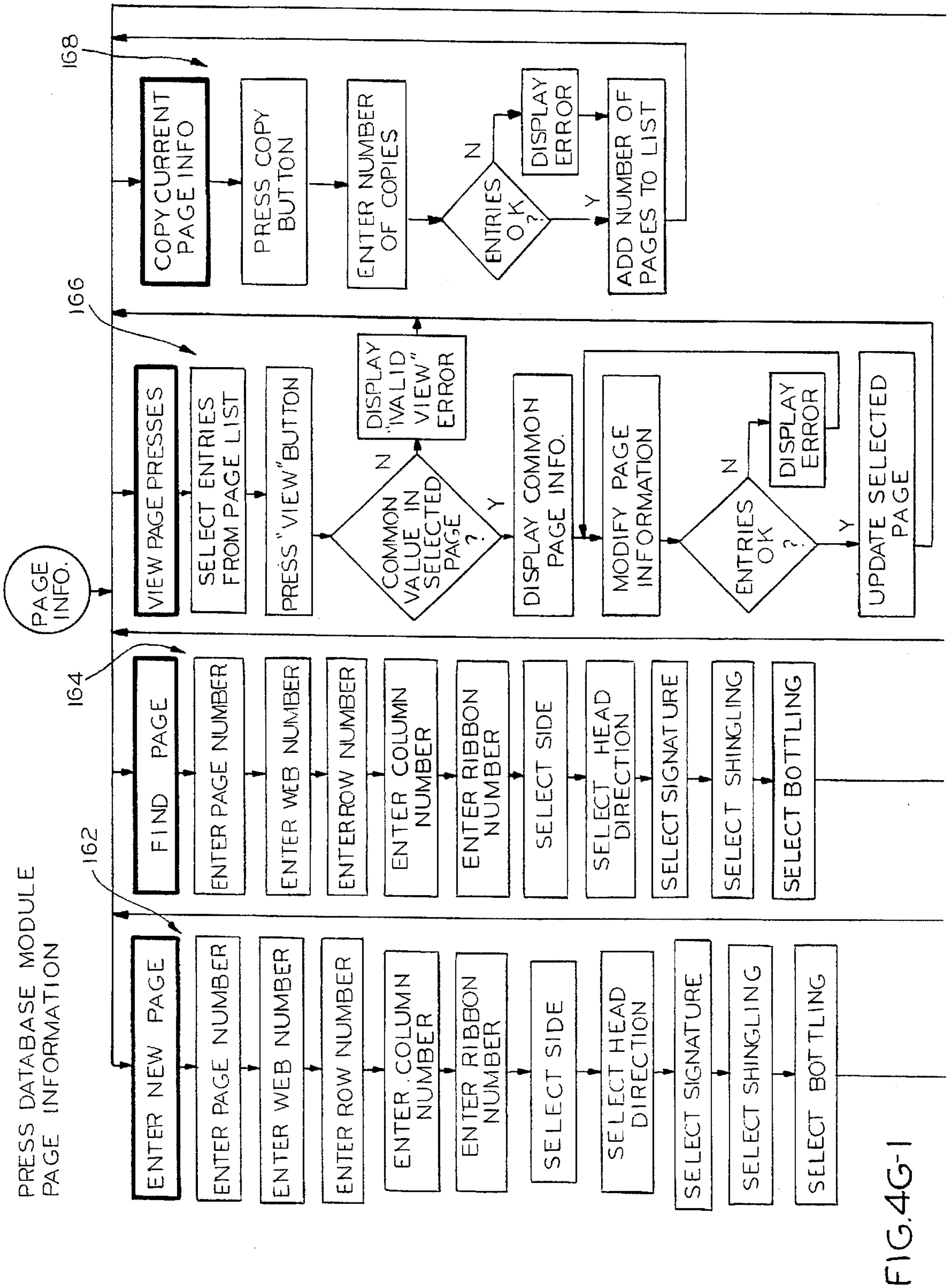
Figures 2, 4G:
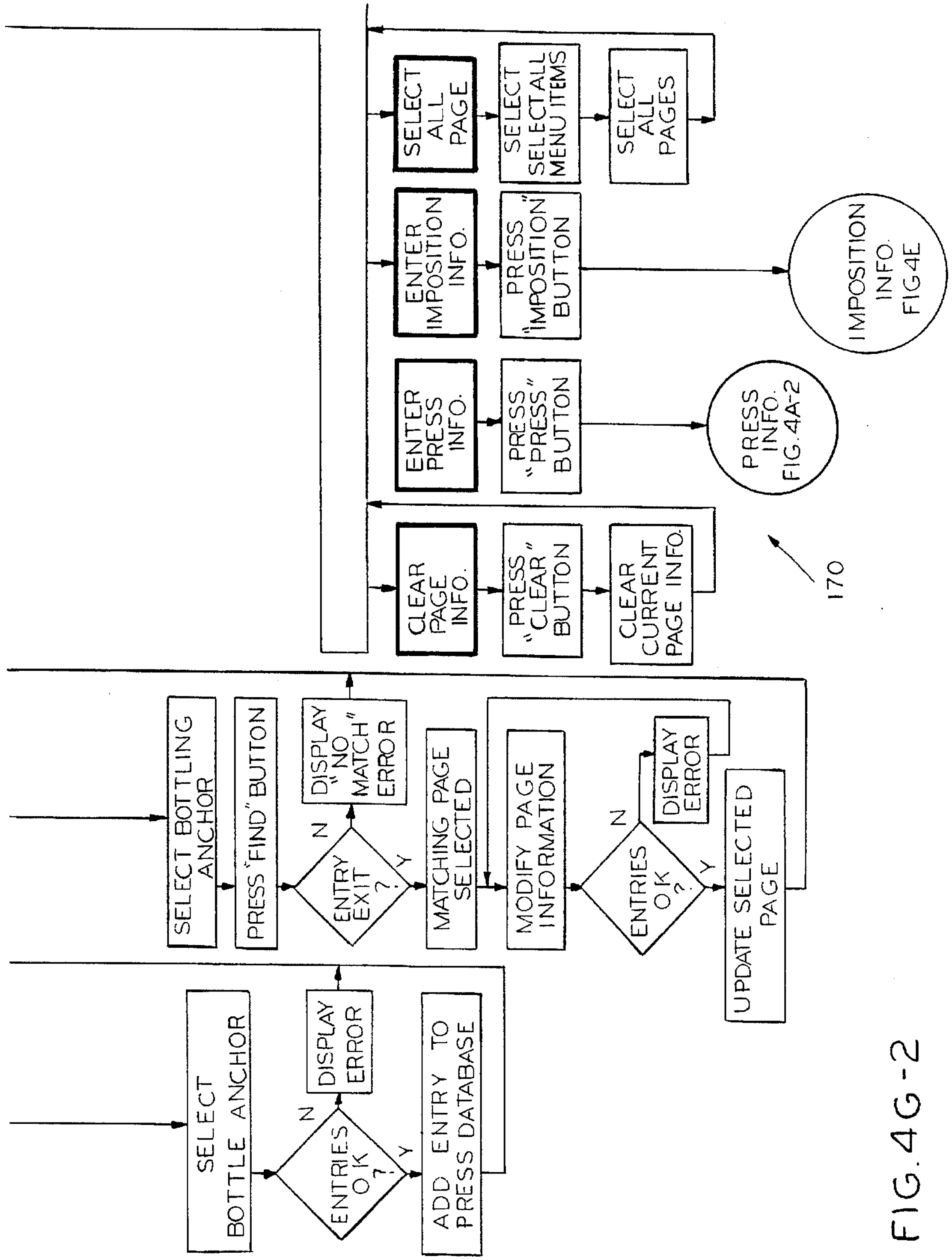

The page information routine is illustrated in FIGS. 4G-1 and 4G-2. The operator fills in a menu requesting for each page the number, position, side, orientation, signature, shingling and bottling information.

The scheme for determining page position is the same as that used for placing printer's marks on the flat, as discussed above. The page orientation is the direction the head of the page faces in the press, related to the gripper or tail side. For the signature of FIG. 5, the table below describes the position and orientation:

| Page | Position | Orientation |
|---|---|---|
| One | (1,4) | Tail |
| Two | (1,1) | Tail |
| Three | (2,1) | Gripper |
| Four | (2,4) | Gripper |
| Five | (2,3) | Gripper |
| Six | (2,2) | Gripper |
| Seven | (1,2) | Tail |
| Eight | (1,3) | Tail |

The side of the flat relates to the front or back. The signature is selected according to the specified pages on for multiple signature deliveries. Shingling direction can either be horizontal, vertical, both horizontal and vertical, or no shingling. Shingling refers to the incremental position offset of the trimmed page within its untrimmed page borders and is used to offset the effects of page thickness in a saddlestitch book. The bottling direction can be either positive, negative or no bottling. This refers to the incremental rotation of the trimmed page within its untrimmed page borders and is used to offset the effects of folding that occurs due to finite page thickness of a given book. When bottling, the position about which to bottle the page must be determined. Possible choices for the anchor point including backbone/foot, backbone/head, trim edge/foot and trim edge/head.

Once entered, page information can be modified using either a find routine 164 or view page routine 166. Similarly, the information can be copied using a copy routine 168 or cleared using the routine 170.

When all page information has been entered, the press delivery is fully defined and can be modified by referring to any of the particular routines in the manner discussed above.

Figures 1, 7A:
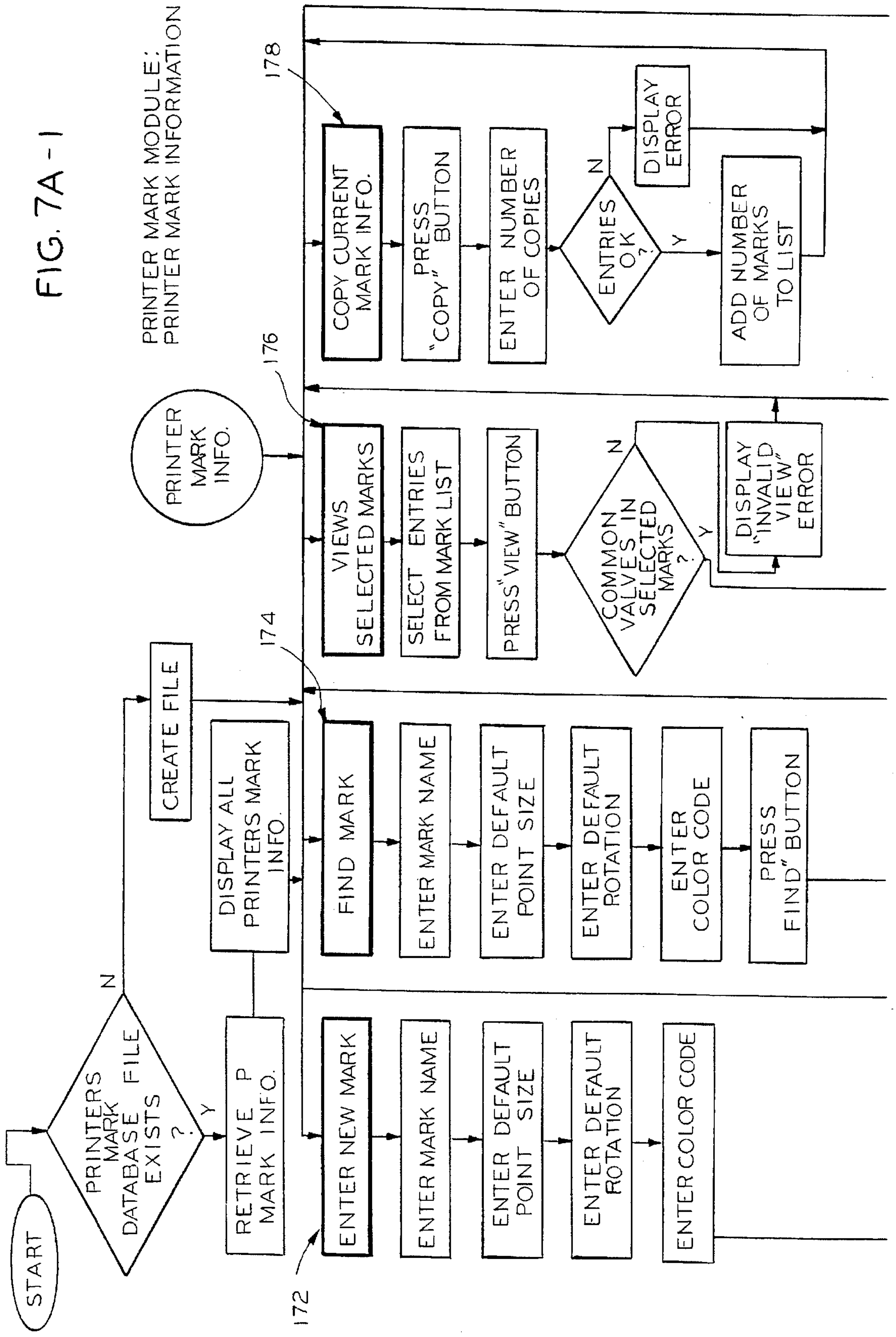
Figures 2, 7A:
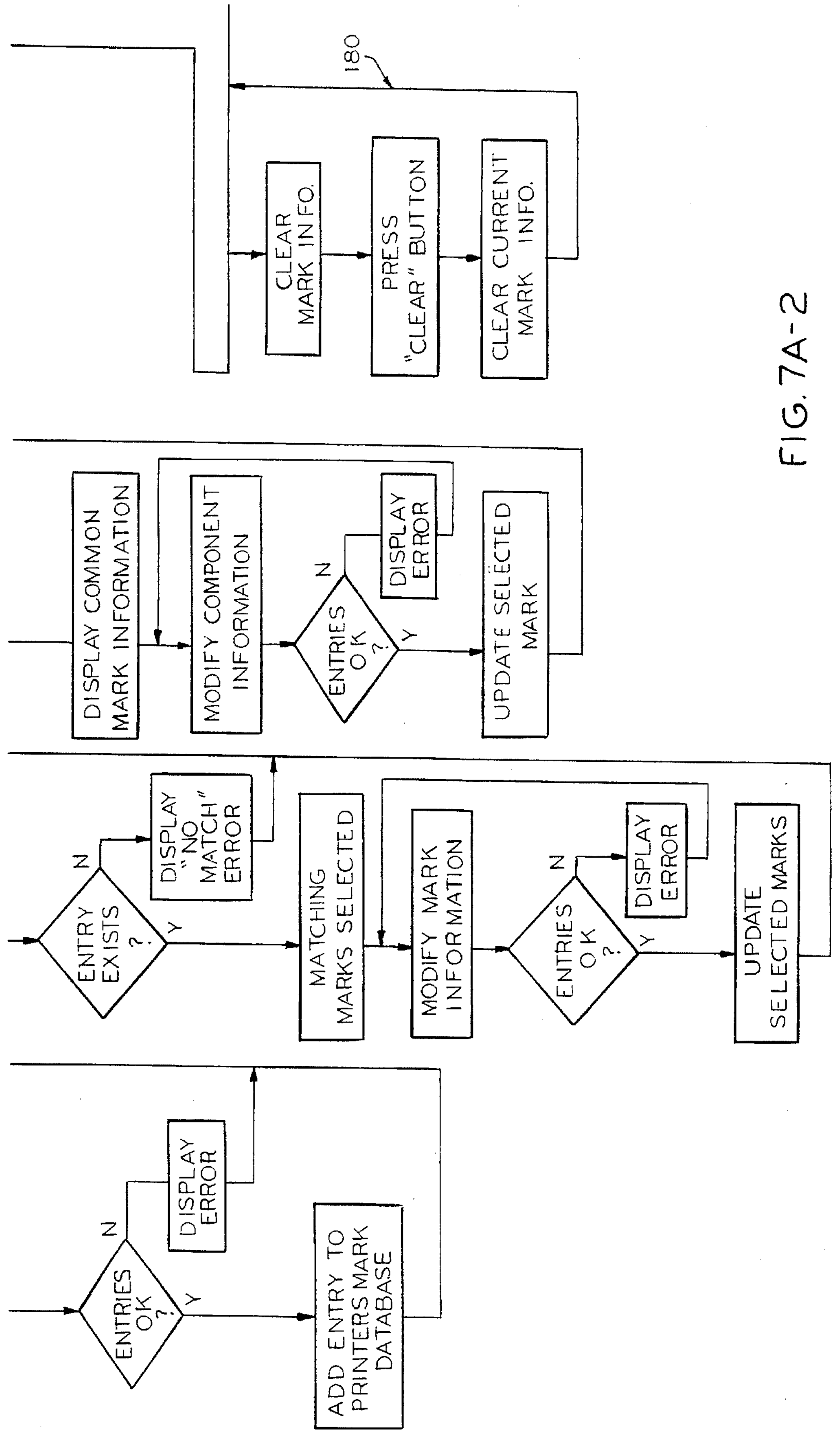

In order to create a printer's mark, the printer's mark module 122 is used. A flow chart for this routine is illustrated in detail in FIGS. 7A-1 thorough 7C. There are two types of printer's marks that can be defined, simple and compound. Simple printer's marks are made up of only one component, whereas compound printer's marks have several components, which together constitute a printer's mark.

To create a simple mark, the operator begins the module and to enter a new mark begins an enter routine 172 and enters the mark's name, default point size and rotation and color code. This information is then stored into the printer's mark database. An entered mark can be modified using a find mark routine 174 or a view selected marks routine 176. Similarly, copy current mark info routines 178 and clear mark info routines 180 are used, as discussed above.

Figure 7B:
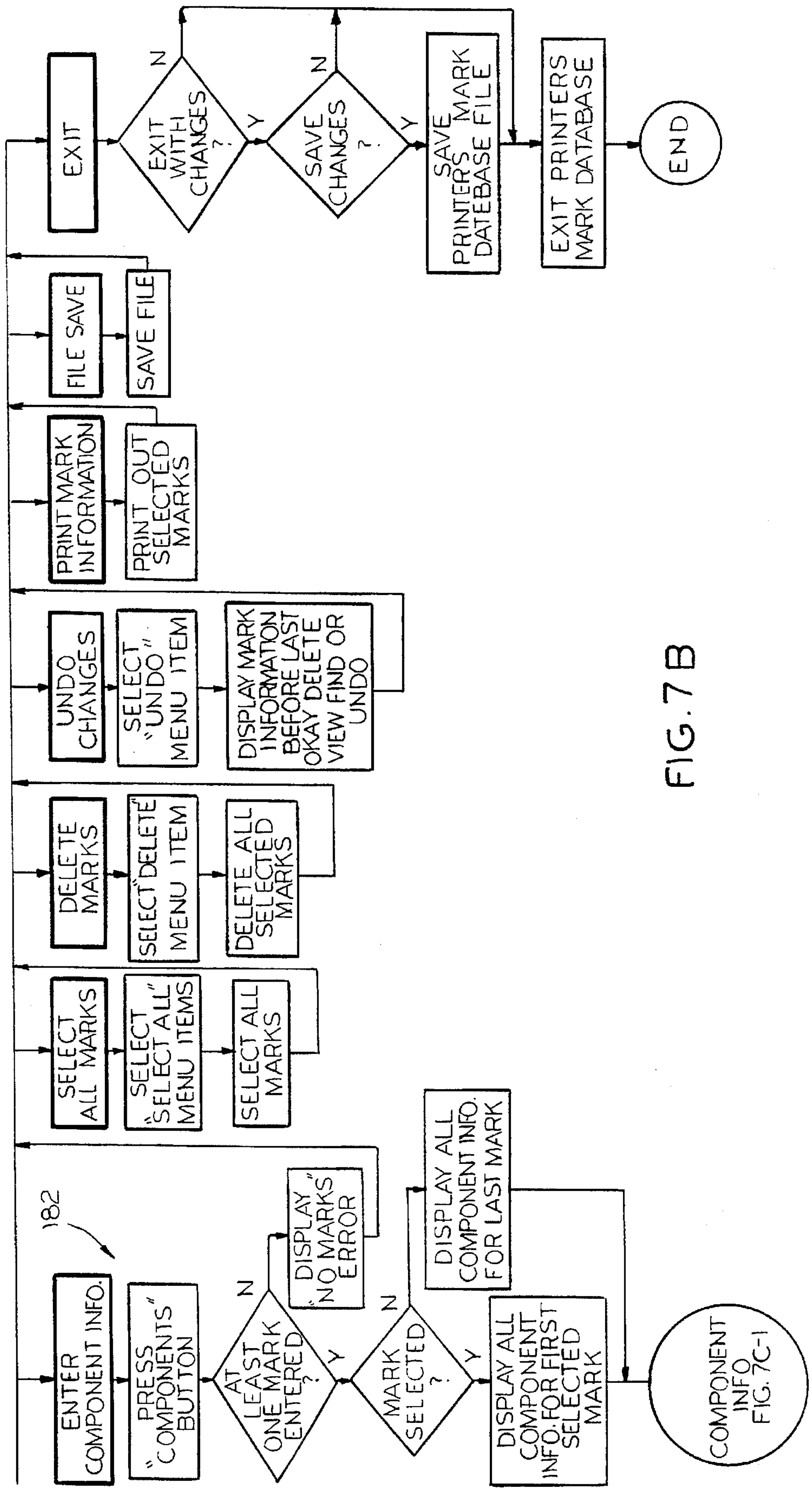
Figures 1, 7C:
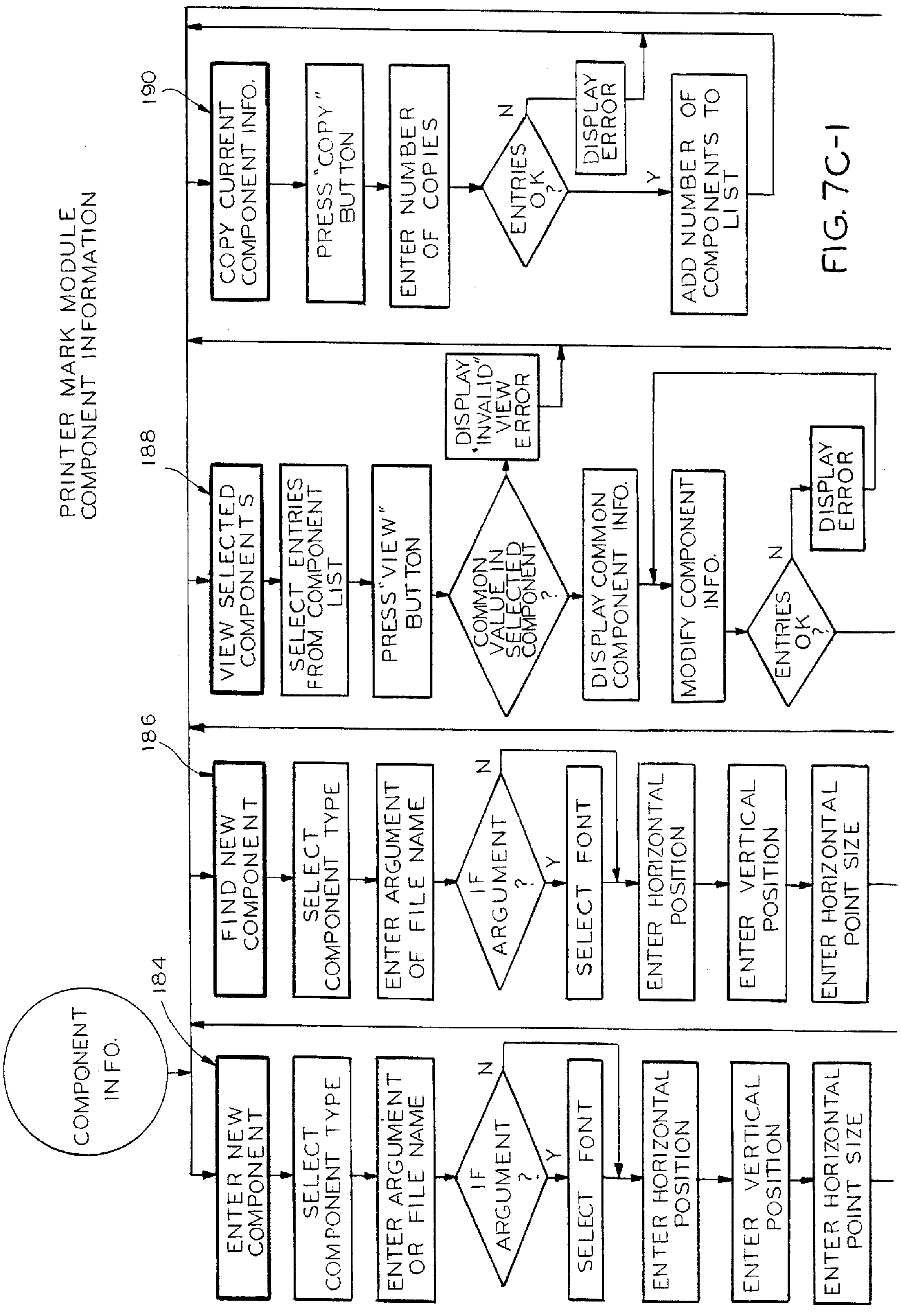
Figures 2, 7C:
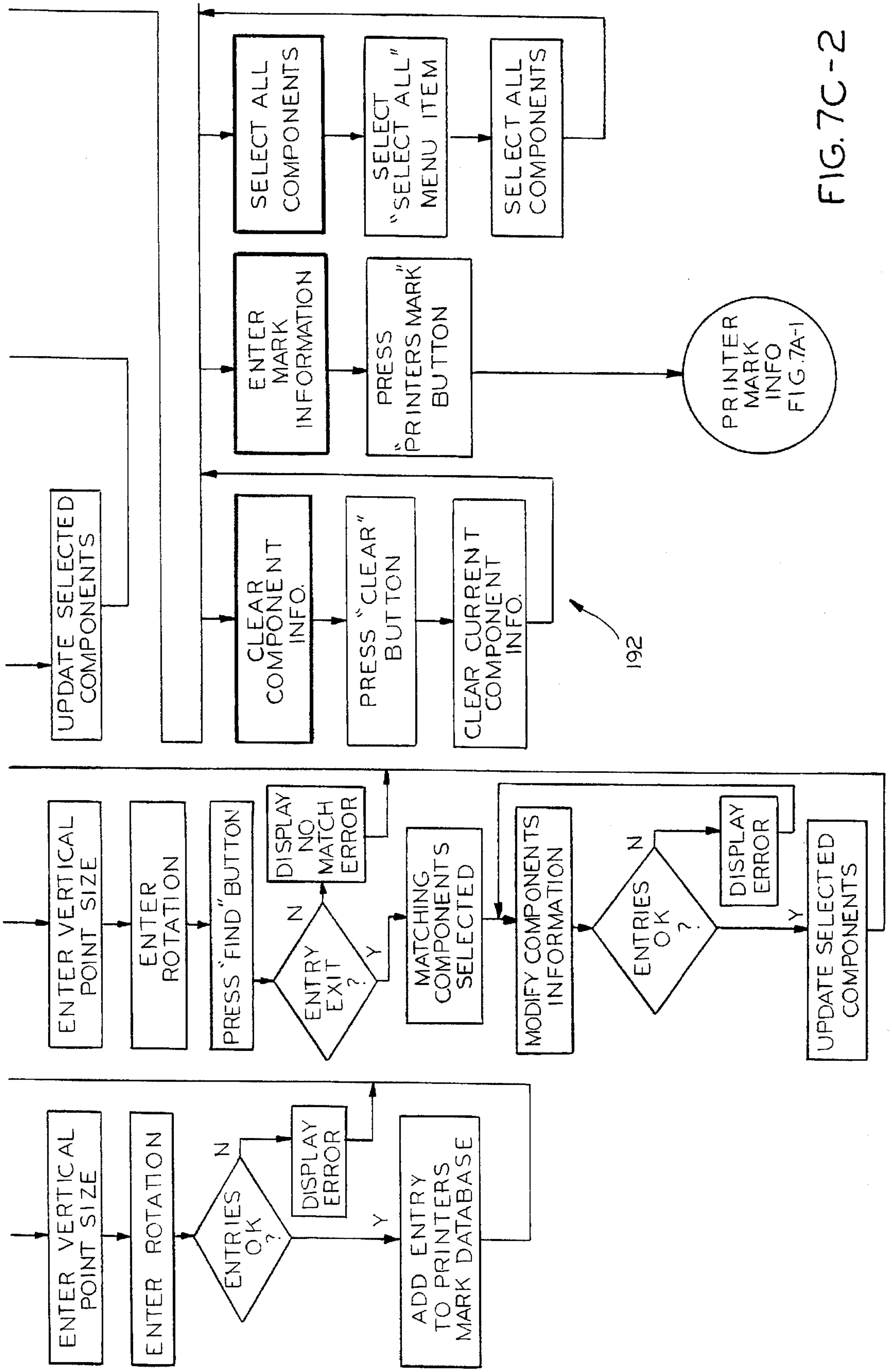

Once a mark has been entered, then it is necessary to decide what type of component the mark should be by proceeding to enter component info indicated by the routine 182 of FIG. 7B. To do so, at least one mark must be entered and subsequently selected from which control advances to a component information flow chart of FIG. 7C. When a new component is entered, it is necessary to select the component type from among image file, text, text slot or Postscript file. An image file consists of a bit map image which was previously created using a separate routine for creating an icon. A text mark is made up simply of text. A text slot is a text mark in which the particular text is variable such as a product ID, job number or customer name. The PostScript file option allows the user to specify self-contained PostScript code, which has previously been created, to be used as a printers mark.

When using the image file option or the PostScript file option, it is merely necessary to enter the name of the bit map image file that contains the image. When using the text option, it is necessary to enter the actual text as an argument and then select the appropriate font. When using the text slot option it is necessary to select from among a list of variable text arguments along with the font in which the information should be displayed. The position and point size information and rotation is not used for simple printer's marks. However, with a compound mark, such information is entered to indicate the relative position of each of the components.

To create a compound printer's mark, it is necessary to enter the information described above for each of the components. A reference point, such as the lower left-hand corner of the first printers mark defined, is used to provide relative positioning of the two components. The size of each of the individual components can be adjusted by using the point size entries as can be the relative rotational position.

To modify a component, a find new component and view selected components routines 186 and 188, respectively, as above, are illustrated. Similarly, copy and clear routines 190 and 192 are provided. Once the component information routine is completed, then the operator can return to the mark information routine of FIGS. 7A-1, 7A-2, and 7B to create a new printer's mark.

Figure 8:
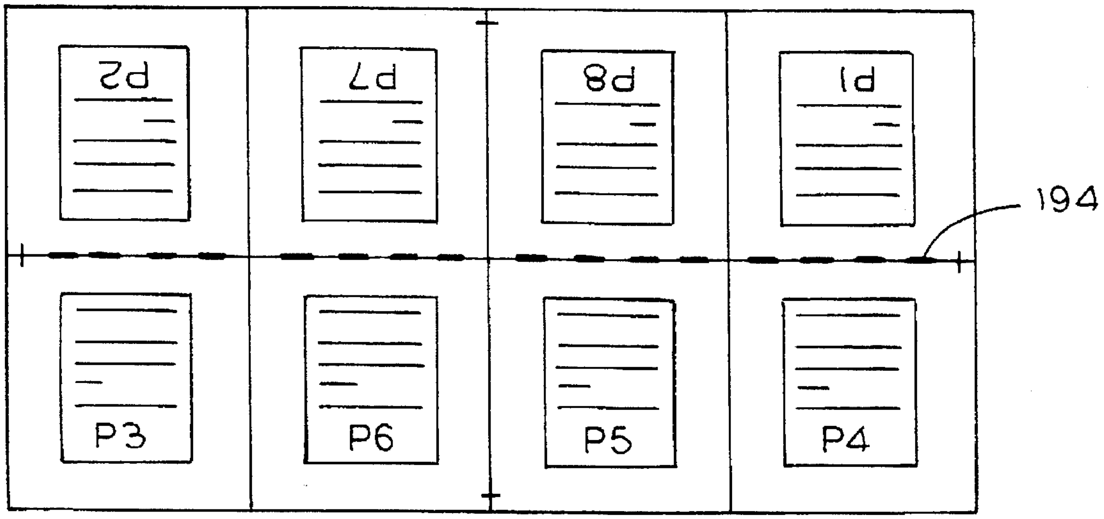
FIG. 8 illustrates an imposed film flat including various printers' marks imaged thereon.

An example of a PostScript file option printer's mark is illustrated in FIG. 8 which comprises a color bar mark 194. With this mark the position of the color bars, described below, is slightly offset for each color separation, so that for a multicolor job the respective color bars do not overlap on the finished product. Such a mark is considered a dynamic mark, as is a collating printers mark, which move position based on parameters such as color separation or form number. A collating printeers mark can use the form number to increment its position from form to form along the backbone of the book.

The color bar mark 194 is a printer's mark consisting of a number of equally spaced color bars, where the reference point is ⅙ of an untrimmed page to the left of the first mark that appears. The pattern of color bars repeats to the right, traversing across a total of four untrimmed pages. These printer marks can be placed on a flat by positioning the reference point of the printer's marks on the desired location of the flat and generating a series of color bars across the flat for a length of four pages, taking into account the untrimmed page size for a given job, dividing the length of the untrimmed page size into six parts, placing the leftmost mark at ⅙ the untrimmed page unit from the reference point and placing four additional marks spaced equally from the first mark. The same pattern repeats for the second, third and fourth horizontal pages, producing the pattern shown.

With a press database and printer's marks being provided, then imposition can be performed on page files and stringout files in accordance with the job specification information received from the customer or as edited by an operator. First, the verification module 110, see FIG. 3, is used for three different purposes. It can be used to analyze files that have been received to provide a general description of information contained in the file. It can then be used to preprocess customer files in order to ready the files for the imposition process. Finally, a verify process is used to check customer's files for certain characteristics to make sure that the customer's job is ready to run when the imposition process begins.

The verify module 110 is illustrated by the flow chart of FIGS. 9A-1, 9A-2, and 9B. Initially, the file to be verified must be selected. This can be done by opening a file either by customer, product and title or by job number. Alternatively, all files can be selected, using the routines 196 and 198, respectively. The analyze routine is illustrated at 200 and is done by choosing a selected file. This function is used when page files first arrive from the customer, and is generally used only when no information has been provided by the customer to indicate what the file contains. This routine is intended to provide some basic information about the files. This analyze routine calls a report routine illustrated in FIG. 9C. Particularly, as illustrated in FIG. 10, a plurality of unknown customer supplied files which might represent four chapters of a book, are received. The analyze routine analyzes them to determine number of pages, the first and last folio in the file, as well as necessary fonts. The report routine begins at a block 202 which opens a file and a block 204 reads a line from the file. A decision block 206 determines if the line is a page comment. If so, then a decision block 208 determines if the line represents the first page. If so, then a block 210 saves the first page folio. If not, then a block 212 determines if the line is the last page. If so, then the block 214 saves the last page folio. Otherwise, from either of the blocks 210 or 214 or if it is not the last page as determined at the block 212, then a block 216 increments the number of pages in the file.

If the line is not a page comment, as determined at the decision block 206, then a decision block 218 determines if the line is a font reference. If so, then the font name is added to the font list at a block 220. Thereafter, or if the line is not a font reference as determined at the block 218 or from the block 216, a decision block 222 determines if the end of the file has been reached. If not, then control advances to the block 204 to read the next line. If so, then the file name is printed at a block 224, the number of pages in the file is printed at a block 226, the first and last folios are printed at the blocks 228 and 230, respectively, and the font list is printed at the block 232 and the routine ends.

Thus, for each of the four files the determined information is available, as illustrated in FIG. 10.

Figures 1, 9A:
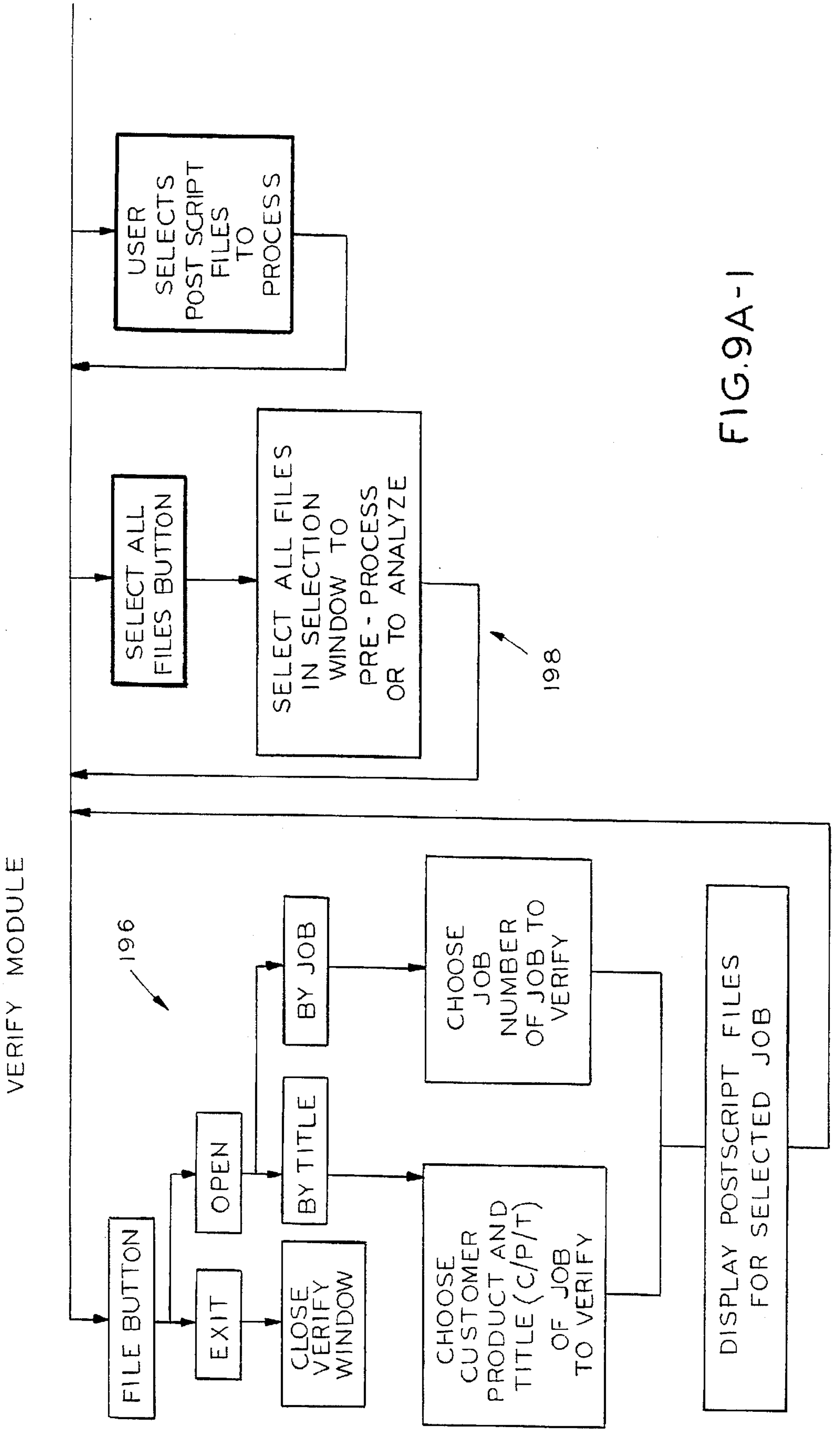
Figures 2, 9A:
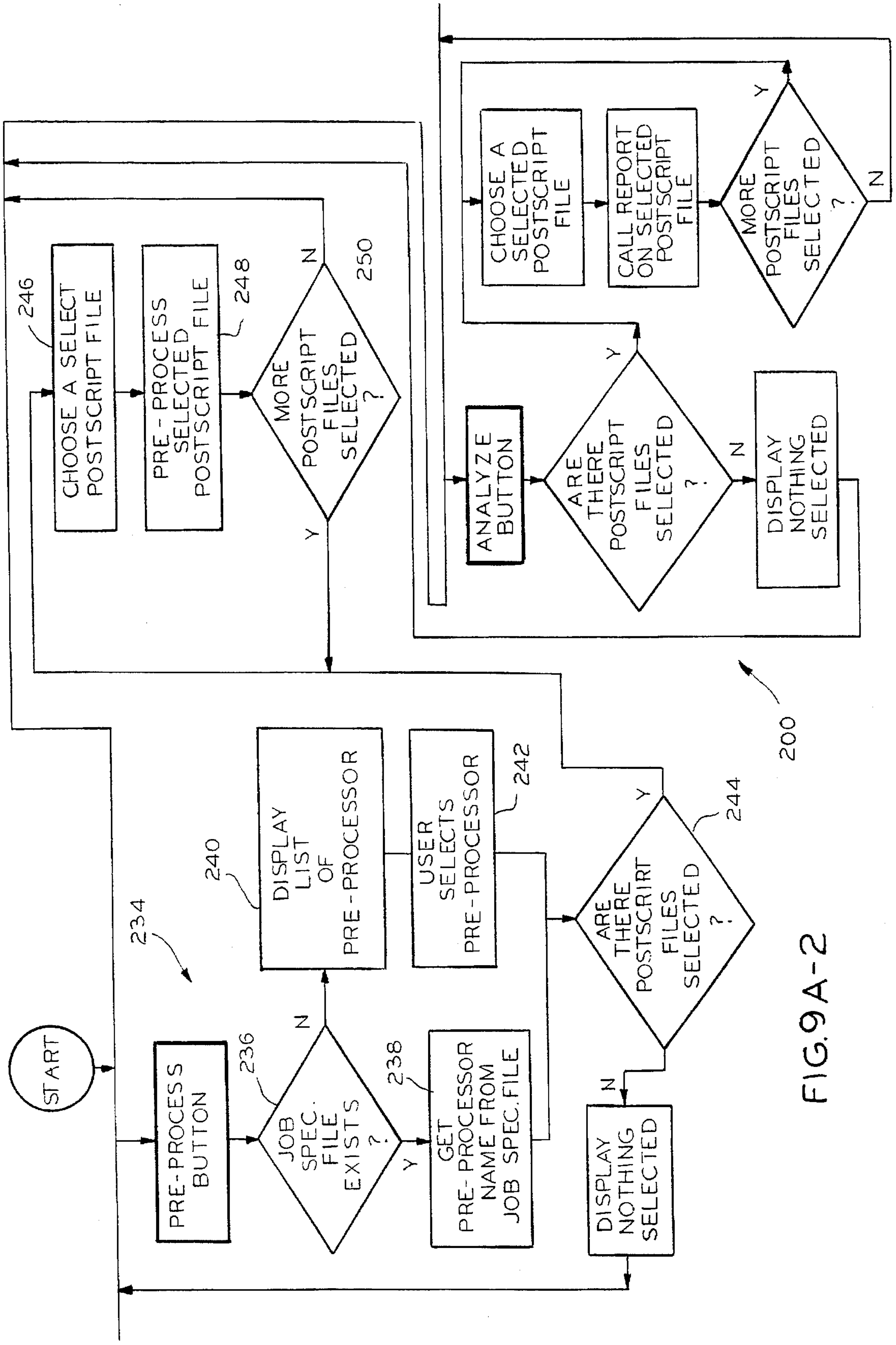
Figure 9B:
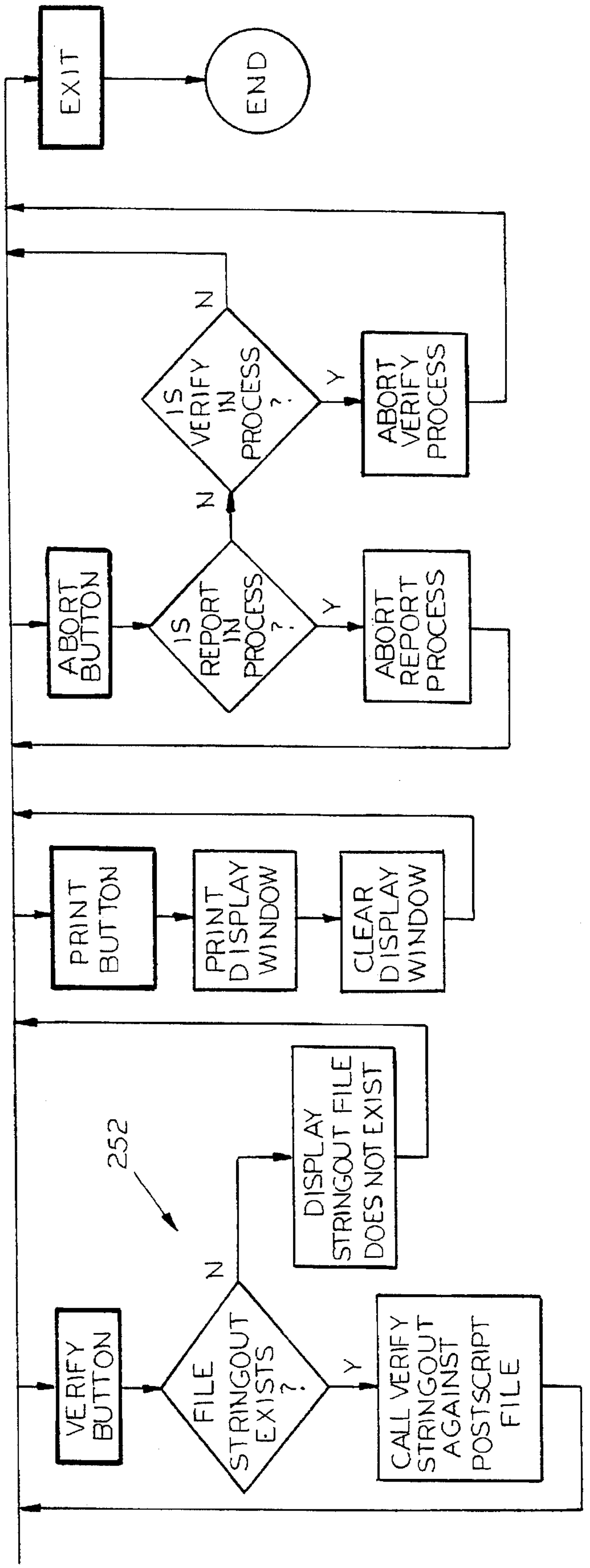
Figure 9C:
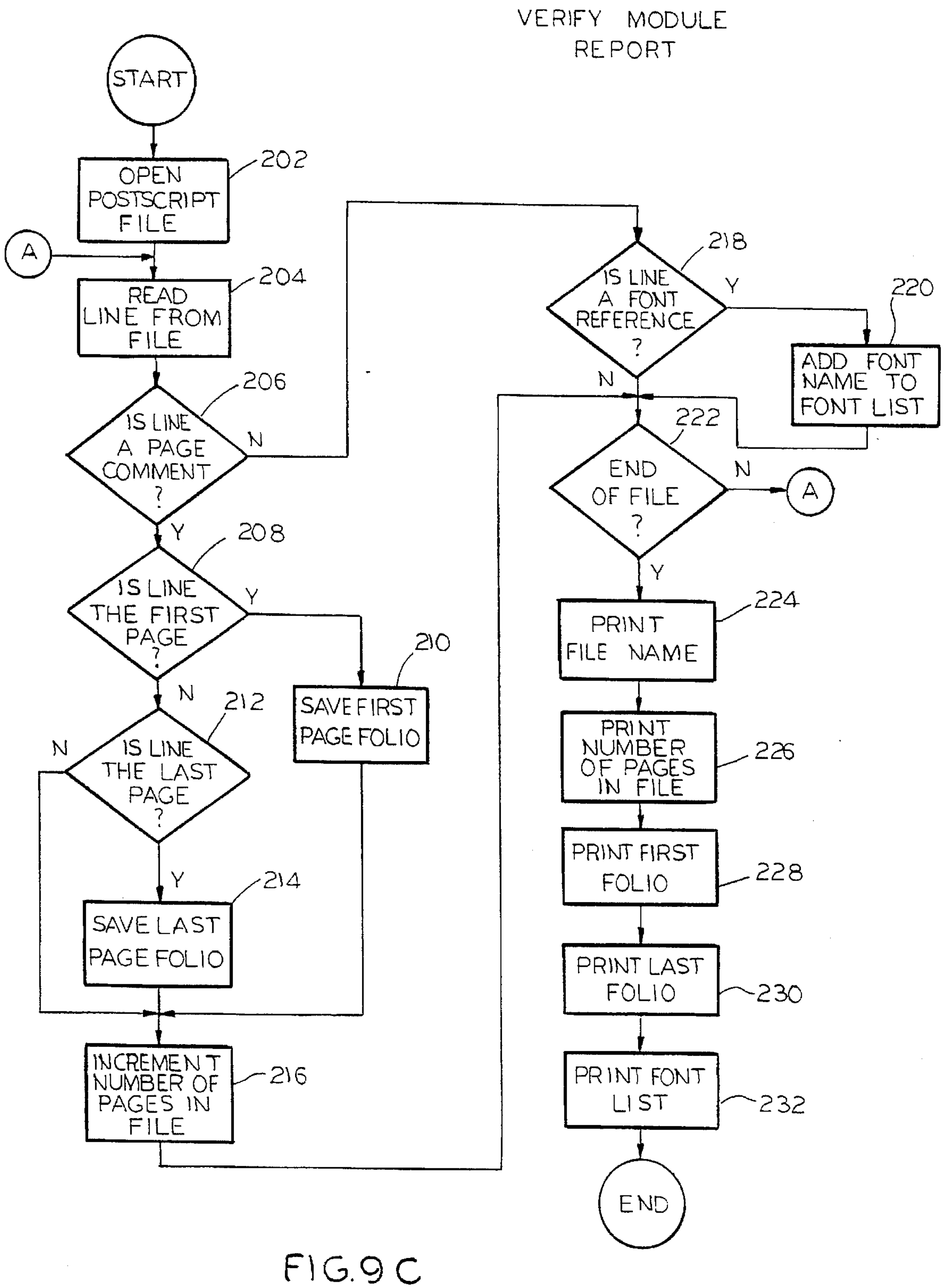
Figure 10:
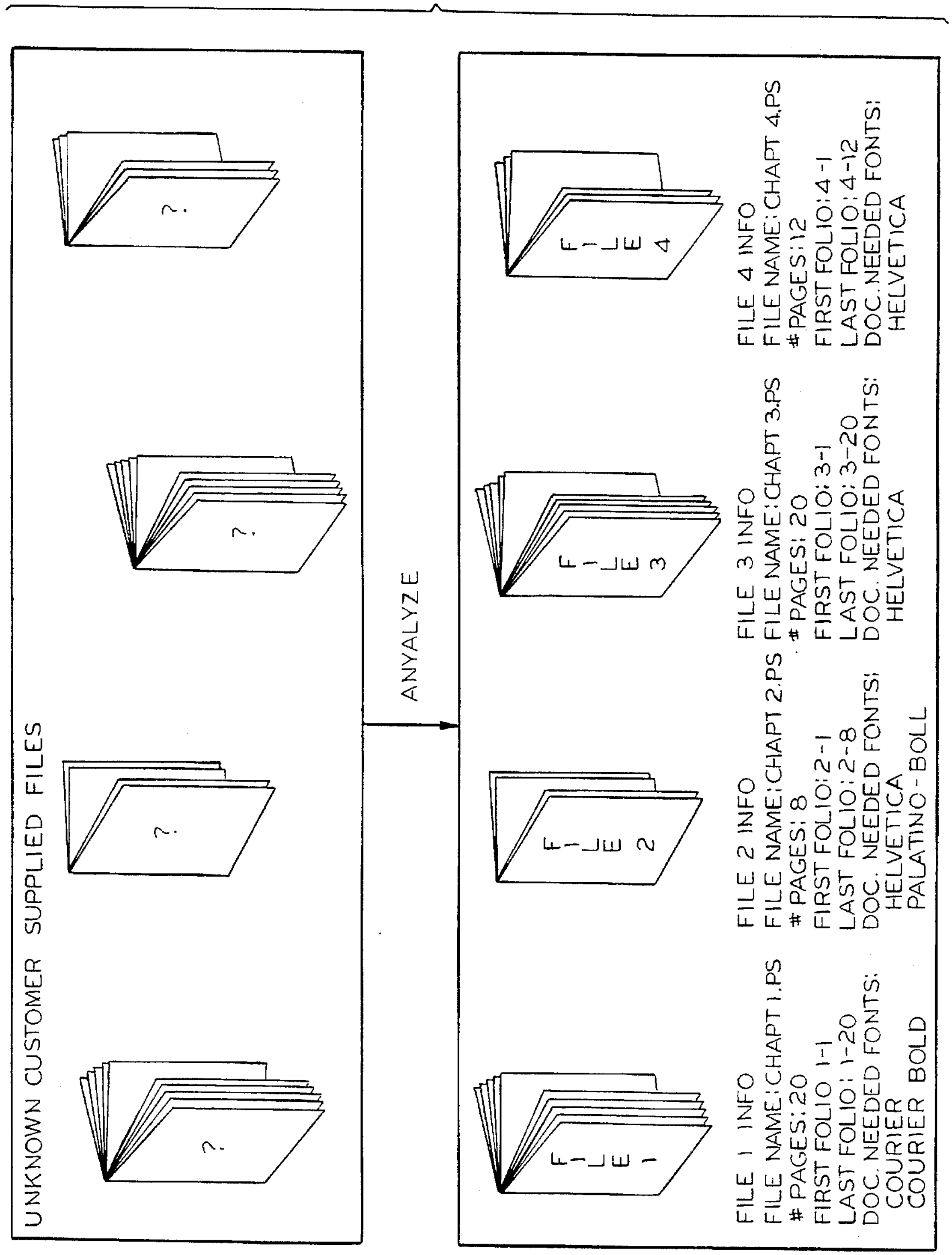

A preprocess routine 234, see FIG. 9A-2, must be performed for each job that enters the DPI system 30. This is necessary because each customer may use a different type of desktop publishing package which prepares PostScript® page data using different techniques. The preprocessing routine 234 determines if a job spec file exists at a decision block 236. If so, then the preprocessor, or desktop publishing package, name is determined from the job spec file at a block 238. If not, then a list of preprocessors is displayed at a block 240 and the user selects from such list at a block 242. From either block 238 or 242, a decision block 244 determines if any PostScript® files are selected. If so, then one is chosen at a block 246 and the preprocessing is performed on the selected file at a block 248. The preprocessing step modifies incoming customer files without changing the content of the printed page by inserting PostScript® comment lines into the customer files. The imposition module 114 later uses the comment lines to locate pages within the customer file when positioning files on imposed flats.

The preprocessing routine 234 also rearranges the customer's files to enable the verify and imposition process to run properly. Thereafter, a decision block 250 determines if more PostScript® files are selected to be preprocessed. If so, then control returns to the block 246. Otherwise, the preprocess routine 234 ends.

Figure 9D:
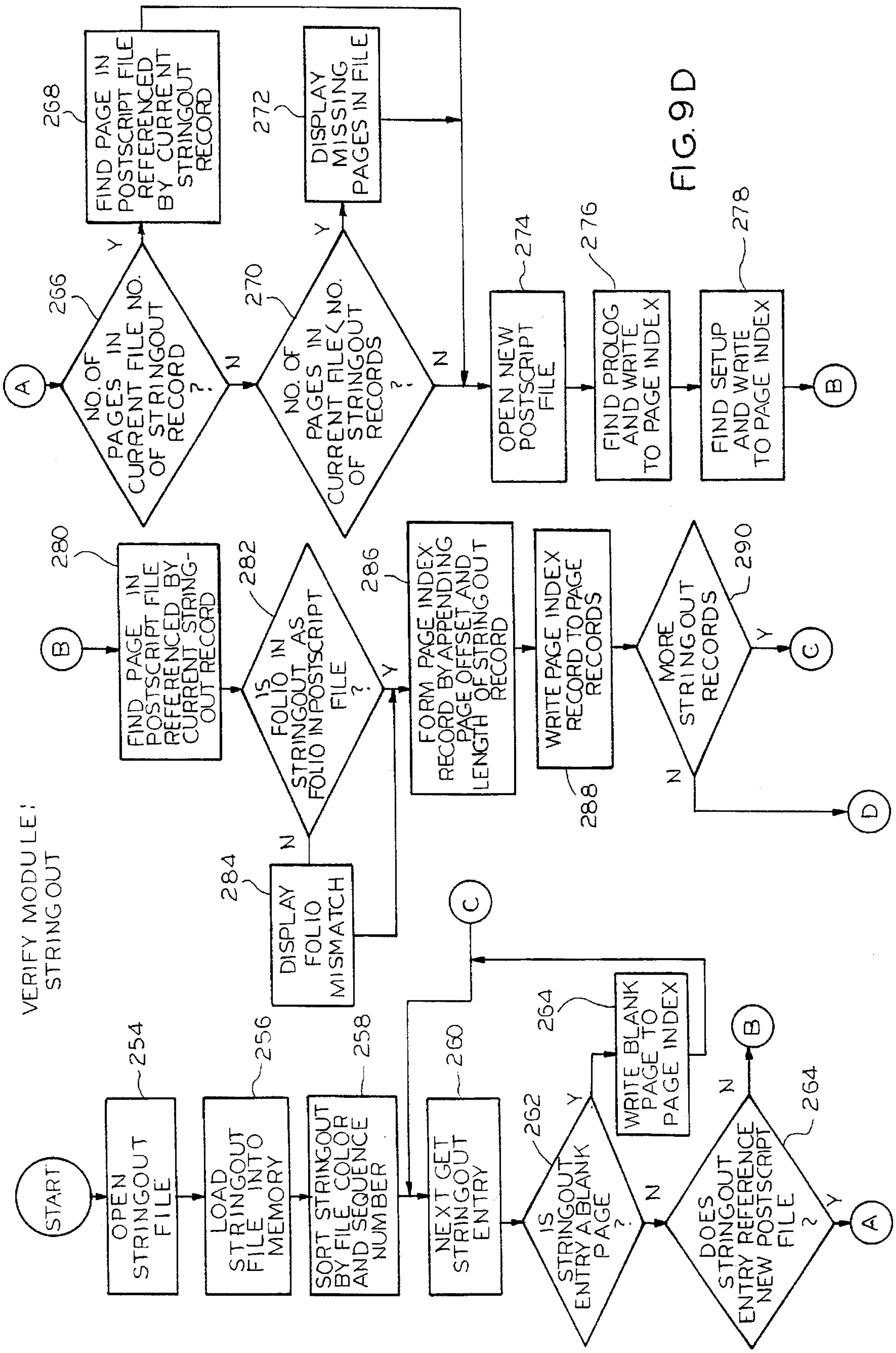
Figure 9E:
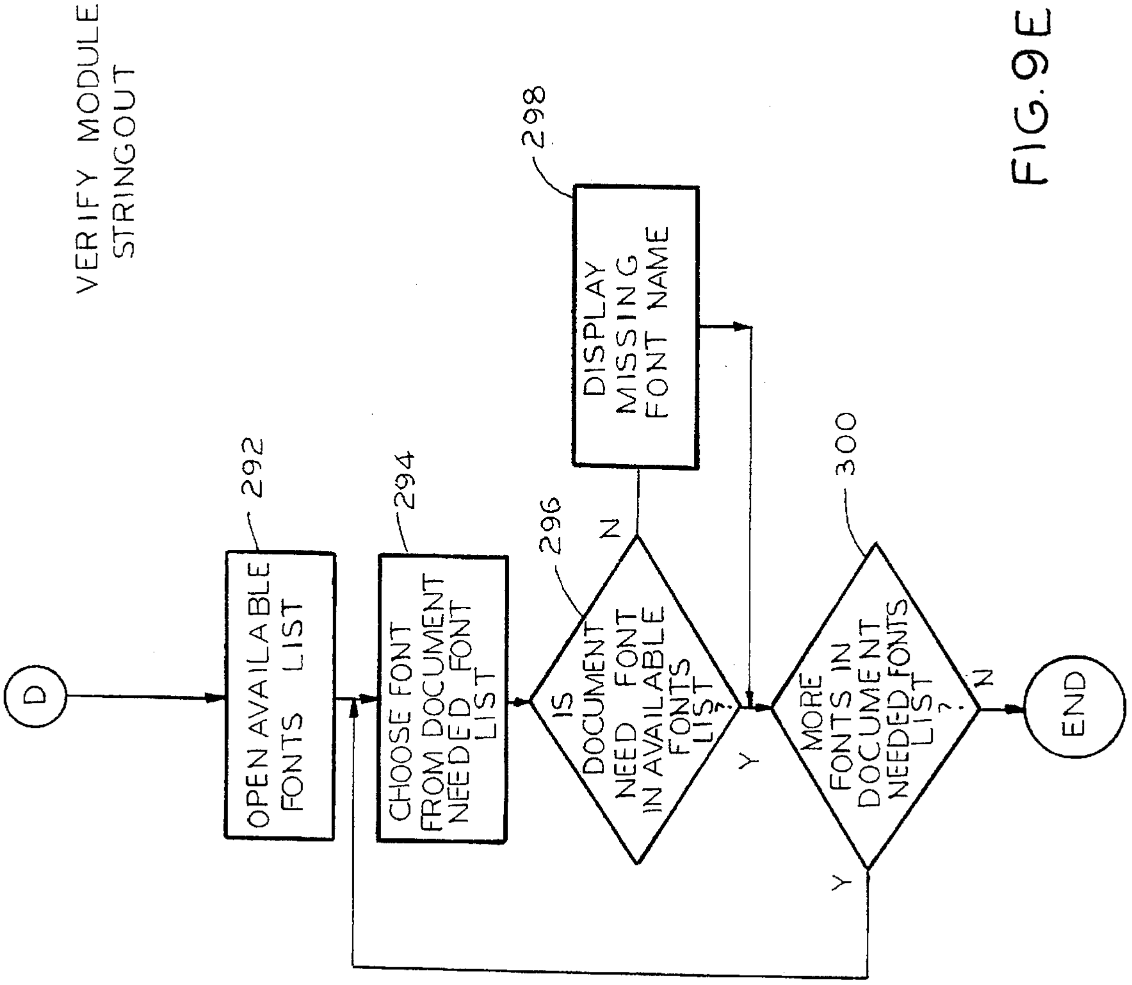

The verify routine, illustrated at 252, uses information from the stringout file, the font manager file and the preprocessed page files to verify whether the job can be successfully run. If a stringout file exists, then a verify module stringout routine illustrated in FIGS. 9D and 9E is illustrated. The routine begins at a block 254 which opens a stringout file and loads the same into memory at a block 256. The stringout file is sorted by file, color and sequence number at a block 258 and the next stringout entry in the sequence is retrieved at a block 260. A decision block 262 determines if the stringout entry is a blank page. If so, then at a block 264 the indicator blank page is written to the page index and control returns to the block 260 to get the next stringout entry. If not, then a decision block 264 determines if the stringout entry reference is a new PostScript® file. If so, then control advances to a decision block 266 which determines if the number of pages in the current file is greater than the number of stringout records. If so, then at a block 268 the routine finds the page in the PostScript® file referenced by the current stringout record. If not, then a decision block 270 determines if the number of pages in the current file is less than the number of stringout records. If so, then at a block 272 the control displays the missing page in the file. If not, or from either block 268 or 272, then a new Postscript® file is opened at a block 274 and a prolog is found and written to a page index at a block 276 and the setup is found and written to a page index at a block 278. Thereafter, or if the stringout entry does not reference a new PostScript® file, as determined at the decision block 264, then control advances to a block 280 which finds the page in the PostScript® file referenced by the current stringout record.

A decision block 282 determines if the folio in the stringout is the same as the folio in the PostScript® file. If not, then a block 284 displays a folio mismatch. If so, then at a block 286 a page index record is formed by appending the page offset in length to the stringout record. A page index record is written to the page index file at a block 288 and then at a decision block 290 a determination is made if there are more stringout records. If so, then control returns to the block 260, discussed above. If not, then control proceeds to the diagram of FIG. 9E and a block 292 which opens the available fonts list for the DPI system 30. A block 294 chooses a font from the document needed font list and a decision block 296 determines if the document need font is available in the fonts list. If not, then a missing font name is displayed at a block 298. If so, then a decision block 300 determines if more fonts are in the document need fonts list. If so, control returns to the block 294. Otherwise, the routine ends.

Thus, for every entry in the stringout file, the verify function checks whether the file name specified in each entry exists in the customer/title/product directory; checks whether a page exists for the file name/page offset specified; and checks whether the folio specified in the stringout matches the folio contained in the page designated by file and offset within the file. For every page in the stringout file, the verify routine gathers the name of all the fonts that are required to print the pages in a given file and compares them to the list of files specified in the font manager file. The font manager file is a file that is created at each site that lists which fonts are available at that site. When the verify process is run on a given file, the verify routine determines the category of each font required to print the pages in a given file, whether the font is a document supplied font or a document needed font.

In order to be able to perform imposition, the DPI system 30 must know which forms are to be used in putting the book together. The form breakup routine 112 is used to provide this information. For each job to be run, the DPI operator must break the book up into a number of forms. Using this information, the DPI system 30 can proceed to impose the pages of the book, selecting the appropriate pages that are to be placed in the designated forms, and output the respective film flats to the typesetter.

With reference to FIG. 11, the form breakups for a saddlestitch and patent or perfect bound book are illustrated. The saddlestitch book is illustrated including four forms which after folding are inserted one inside the other, as is well known. With the patent bound book, the forms after folding are stacked atop one another. During the form breakup routine, the operator must make several selections to describe each form that makes up the book including the form delivery to use, the bottling amount to be applied to the page, the amount of shingling to be applied to the page and the pages that go on the form. The routine for doing so is illustrated in FIGS. 12A–12C.

The forms breakup module begins at a block 400 which chooses a customer, product and title of job. A decision block 402 determines if a form breakup file exists. If so, then the file is retrieved at a block 404 and displayed at a block 406. Otherwise, a new form breakup file is created at a block 408. A decision block 410 then determines if a stringout file exists for the job. If not, then the form breakup module cannot be used and control returns to the block 400. If so, then the stringout file is retrieved at a block 412. Next, a decision block 414 determines if a job spec file exists and if so retrieves the same at a block 416. If not, then control returns to the block 400 as the form breakup module cannot proceed for the particular job.

Once the form breakup file has been created or retrieved along with the stringout file and job spec file, then the operator can select among various functions. When the file is first created, then control advances to an enter new form entry routine 418. Initially, the form delivery is selected by selecting a print division where the delivery exists at a block 420, selecting a particular press at a block 422 and selecting a press delivery at a block 424. These relate to the press delivery discussed above relative to the press database module 118.

The amount of bottling to be applied to the pages is selected at a block 426. This amount is measured in inches and corresponds to the amount of horizontal or vertical distance at the corner that the trimmed page is shifted from the anchor position. A shingling code is selected at a block 428. Shingling refers to the process of shifting the image on the page a small distance to compensate for the finite thickness of the paper that makes up a book and the resulting movement away from the backbone at the inner pages of a saddlestitch book undergo. The actual range of distance that a saddlestitched books pages are shingled is determined via the job specification information. However, during the form breakup process the operator must specify the relative depth of each form within the book. Particularly, with reference to FIG. 11, for the saddlestitch book, the form 1 represents the outermost form nearest the cover, and form 2 the second outermost form, the form 3 the third outermost form and the form 4 the fourth outermost form.

Next, it is necessary to determine which pages are placed on each form. Choosing the pages requires the operator to enter either only the sequence number or the folio number of the first page on the form. The form breakup program, using the information contained in the press database, job specification and stringout files, automatically determines the other pages that are placed on the form, see FIG. 13. The program chooses the correct pages whether the job is saddlestitch or patent bound.

Particularly, at a block 430 the operator enters the original number of folio number of the first page of signatures. A decision block 432 determines if the numbers within the number of pages in the job or folio number exists in the stringout file. If not, then control returns to the block 430. If so, then a decision block 434 determines if the first page is designated for all signatures. If not, then control returns to the block 430. If so, then the control waits at a block 436 for the operator to press an okay button and a decision block 438 determines if the entries are acceptable. If not, than an error is displayed at a block 440 and control returns to the main menu listing. If the entries are okay, then the entry information is added to the form breakup file at a block 442, then a decision block 444 determines if inserting is necessary. If not, then the new form entry routine 418 ends. Otherwise, the form number is updated at a block 446. The routine 418 then ends. If the form entry is to be modified, then a find forms routine 448 or view select forms routine 450 can be utilized, similar to that discussed above. Also, a copy current forms routines 452 is utilized as well as a clear form information routine 454, similar to those discussed above. Additional routines are provided for selecting all forms for breakup, deleting forms, inserting forms or appending forms as well as printing the form breakup file or saving the file as well as a normal exit routine.

Once all of the above has been done, then the imposition module 114 uses data from the verification and form breakup programs to impose incoming pages into a large page description language file. This file is used to generate the film output to create offset plates or to drive a direct-to-plate device. A number of files are produced for the job, corresponding to the offset plates (or depending on the size limitations of the output device parts of output plate offset plates which are then manually stripped together) that are required to produce the job.

With reference to FIGS. 14A–14E, a flow diagram illustrates operation of the software program for implementing the imposition module. When the module is started, as by an operator selecting an imposition icon, control begins at a block 500 which requires the operator to choose the customer, product and title or a job number for the job to be imposed. A decision block 502 then verifies that a form breakup file exists for the select job. If not, then the operator is notified of an error at a block 504. Assuming that a form breakup file exists, then it is retrieved at a block 506.

As discussed above relative to the form breakup routine, a job can consist of numerous forms. A routine 508 is provided for selecting which of the forms should be imposed. This routine begins at a decision block 510 which determines if a stringout file exists for the job. If not, then the operator is notified of an error at a block 512 and control returns to the menu. If a stringout file exists, then at a block 514 the module reads the stringout file and retrieves color information. The operator then selects all of the forms or an individual form number or individual sequence number or folio number or loads a partial job for imposition at a block 516. The selected forms from the form breakup window are displayed at a block 518 and the operator can then undo or delete selected forms at a block 520. Next, at a block 522, the operator chooses a side and web to impose. A decision block 524 determines if an auto spool option has been selected. If so, then at a block 526 the color, device and priority for spooling are chosen. Thereafter, the routine 508 ends.

Once a form to impose has been selected, then a routine 528 for imposing flats can be used. This routines begins at the decision block 530 which verifies that a job spec file exists. If not, then the operator is notified that there is an error at a block 532. Otherwise, the job spec file is read at a block 534 and control proceeds to a block 536 at which the module reads the press data base file and the printer's mark database file selected by the forms breakup module. Thereafter, a series of loops are implemented for each flat, which can comprise numerous forms, sides, webs and colors.

The looping begins at a decision block 538 which determines if there is another form to impose. If not, then a decision block 540 determines if the autospooling option has been selected and if so the flats are spooled to an output device automatically at a block 542 and control then returns to the main menu, see FIG. 14A.

If another form is to be imposed, as determined at the decision block 538, then a decision block 544 determines if there is another side to impose. If not, then control returns to the decision block 538. If so, then a decision block 546 determines if there is another web to impose. If not, then control returns to the decision block 544. If so, then a decision block 548 determines if there is another color to impose. If not, then control loops back to the decision block 546. If so, then a page order file is created at a block 550. This page order file is obtained from the press database and contains the order of pages in the flat. Thereafter, a delivery template is created at a block 552. The delivery template is a PostScript® representation of the flat file without the page information.

The routine continues at a block 554 which generates the printer's marks required for the particular press delivery and inserts the same into the template created at the block 552. At a block 556 the determination is made as to how a flat should be tiled. This entails reading the dimensions available on the output device and the sizes of the pages and delivery to optimize tiling. If the flat is too large for the output device, then tiling is used to split the flat into multiple tiles. At the block 556, a determination is made as to how best to breakup the flat and into how many pieces. Thereafter, at a block 558 the row and column position for pages in the flat are set. This represents the absolute position for each page in the flat including untrim height and width.

Beginning at a decision block 560, a plurality of loops are implemented for generating PostScript® translations of pages and positions. The decision block 560 determines if there is another tile to impose. If so, then a decision block 562 determines if there is another column to impose. If not, then control returns to the block 560. If so, then a decision block 564 determines if there is another row to impose. If not, then control returns to a block 562. If so, then a decision block 566 determines if the page is the first page and if not a page cleanup routine is implemented at a block 568.

For the particular tile, column and row, the actual translation is performed beginning at a decision block 570 which determines if it is the end of the previous tile and if so sets an end of tile PostScript® code at a block 572. If not, then a page startup code is set at a block 574. This calls a PostScript® routine. The particular page information for the template is translated to a row and column at a block 576. If head rotation is required according to the form of the press delivery, then the same is performed at a block 578. If bottling or shingling are necessary for the particular page, then they are done at blocks 580 and 582, respectively, and a comment for page insertion is set at a block 584. This provides an identification as to where the customer page will be inserted in the template. Thereafter, control returns to the decision block 564.

If it had been determined at the block 560 that there is not another tile to impose, then control advances to a block 586 which creates a template index. This is an array which defines the page locations in the template. At a block 588 a prologue is written to the output flat file. This relates to PostScript® setup information for the flat file. Driver information from standard code and driver file are written to the output file at a block 590 and the PostScript® variable information in the job spec and form breakup files are set at a block 592. This can be used, for example, by printer's marks, as discussed above.

A loop then begins at a decision block 594 for writing setup information and the page data to the output file for each page. At the decision block 594 determination is made if there is another page to place in the flat. If so, then the setup information is written to the output flat at a block 596 and the page data itself is written to the output file at a block 598. Thereafter, or if there is not another page to place in the flat as determined at the decision block 594, then a decision block 600 determines if the form is blank. If so, then it is moved from the file at a block 602 to avoid printing blank pages. Thereafter, or if the form is not blank, then the imposed flat routine 528 ends and control returns to the main menu.

Figure 14A:
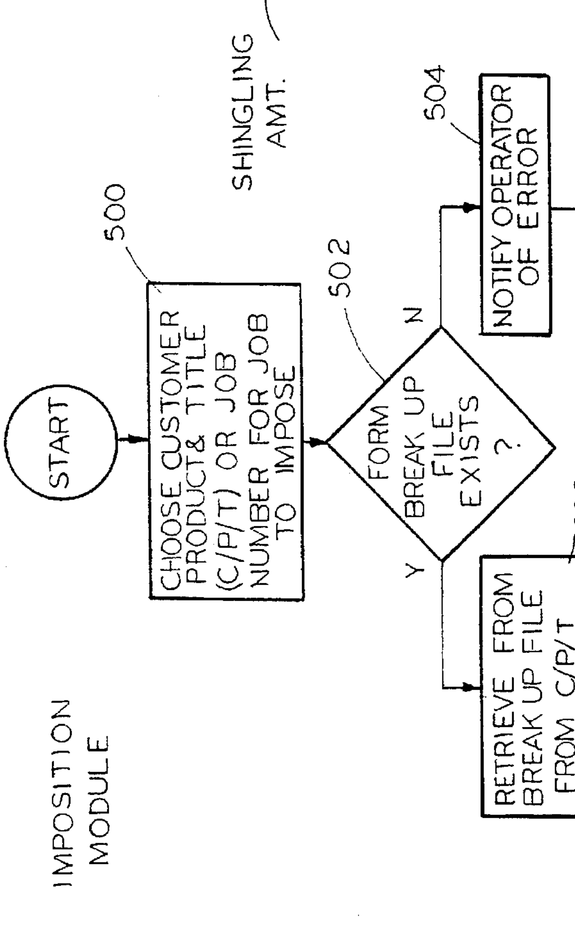
Figure 14A:
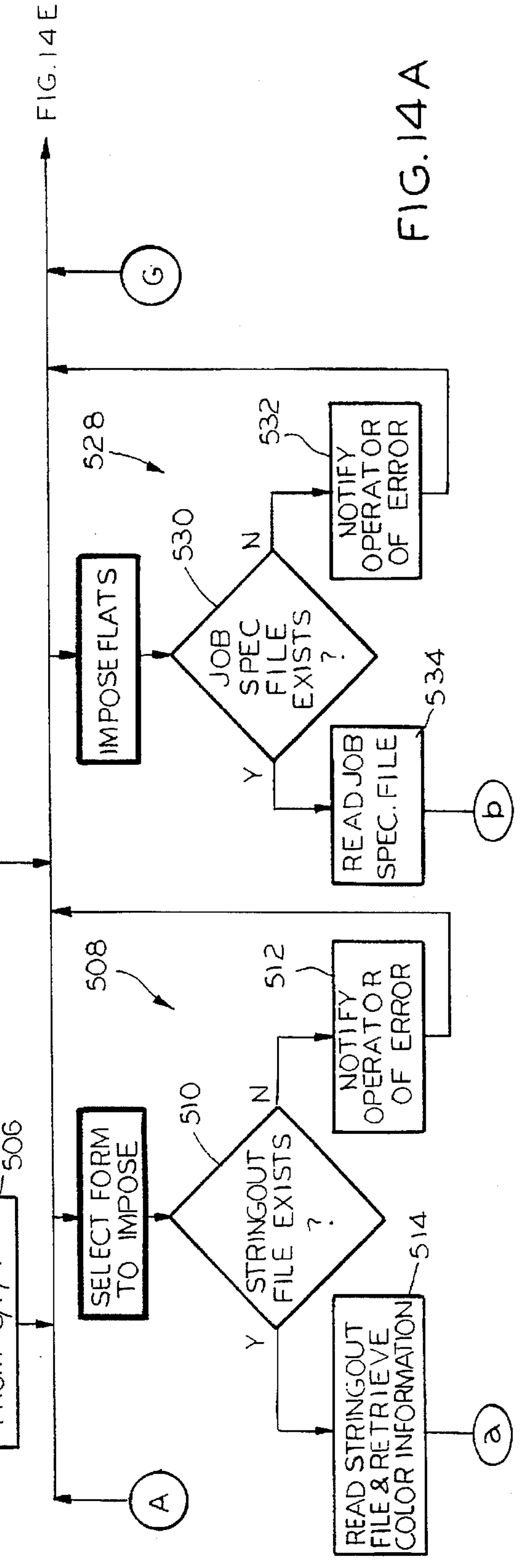
Figure 14B:
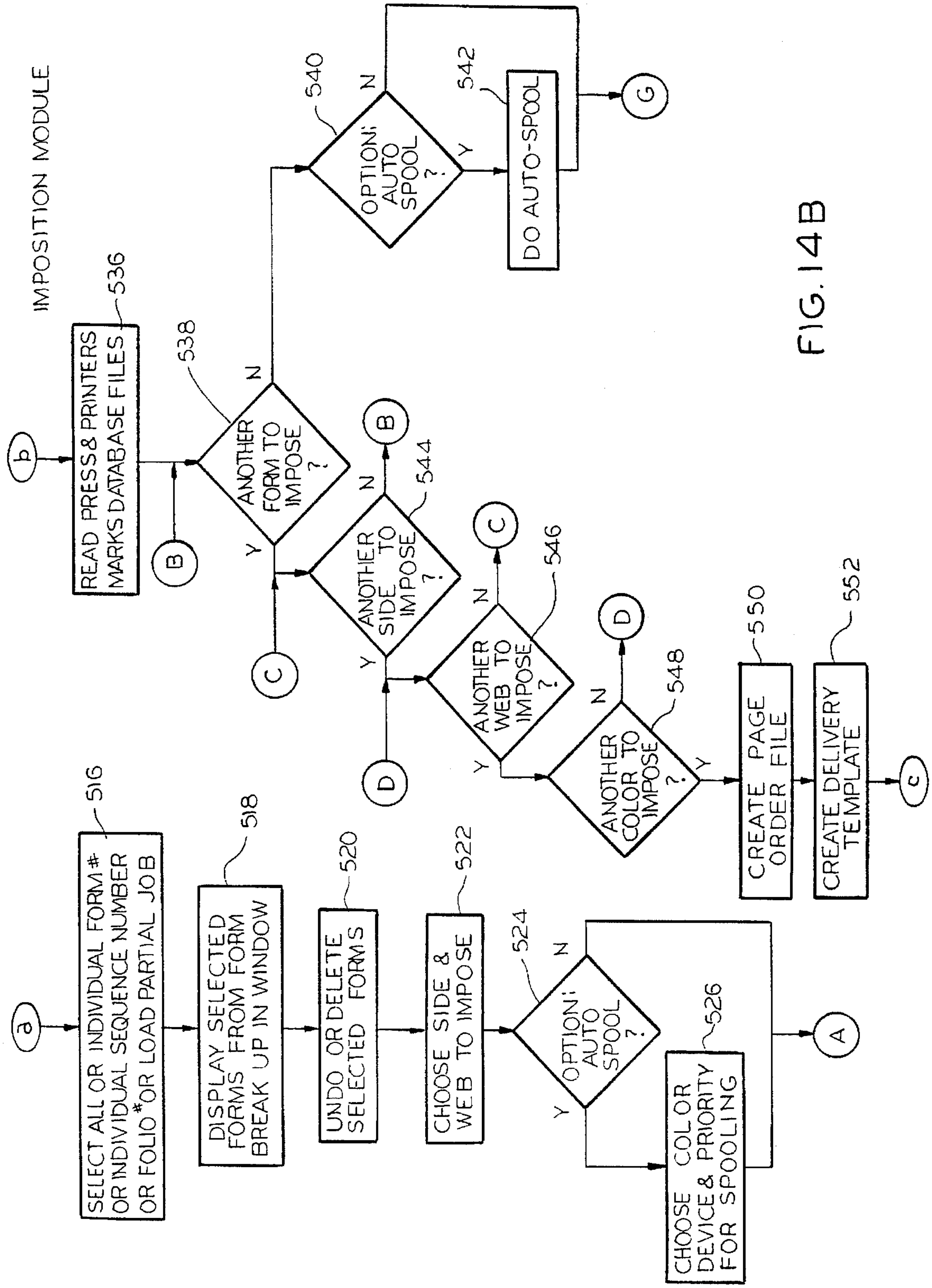
Figure 14C:
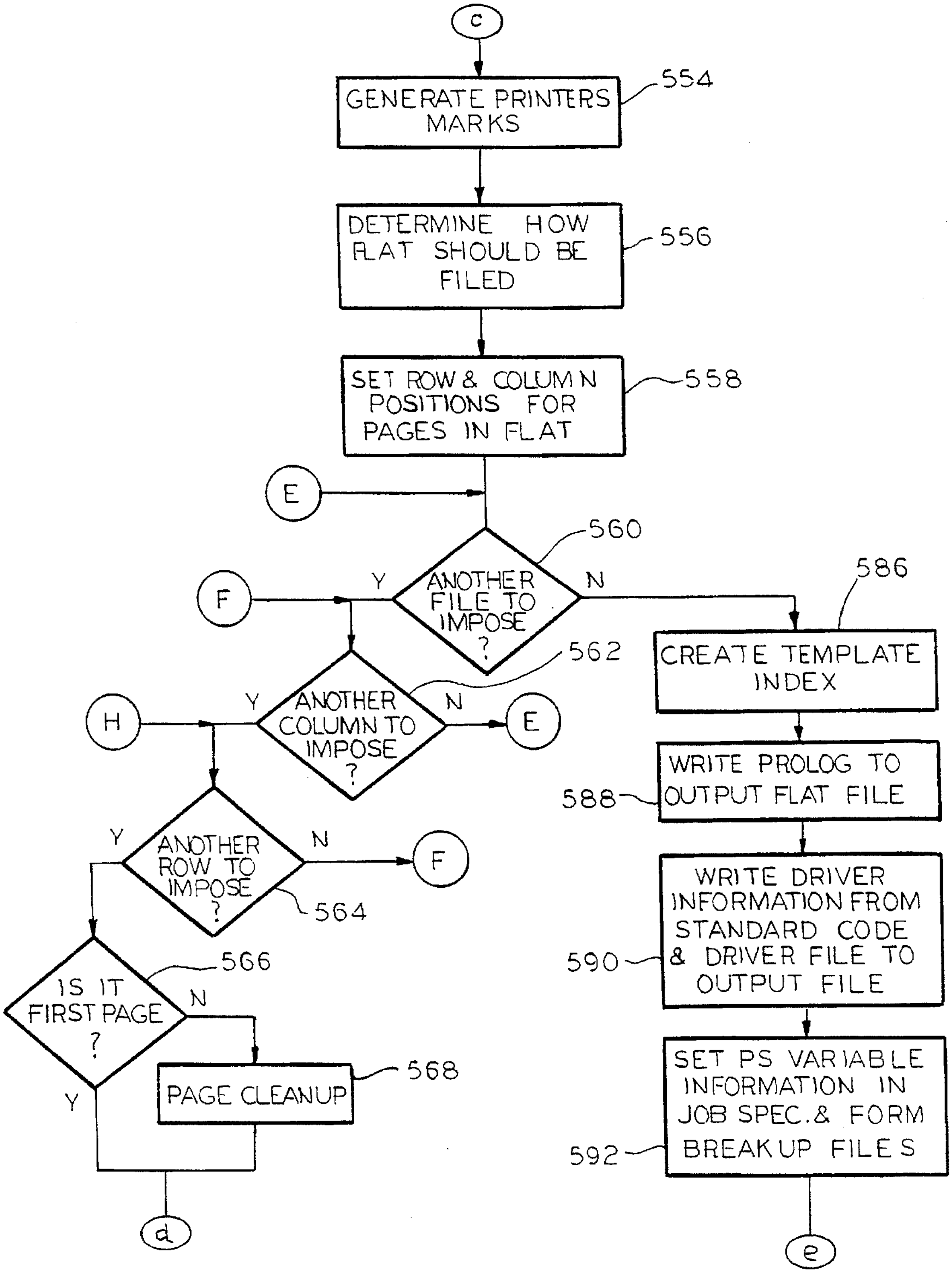
Figure 14D:
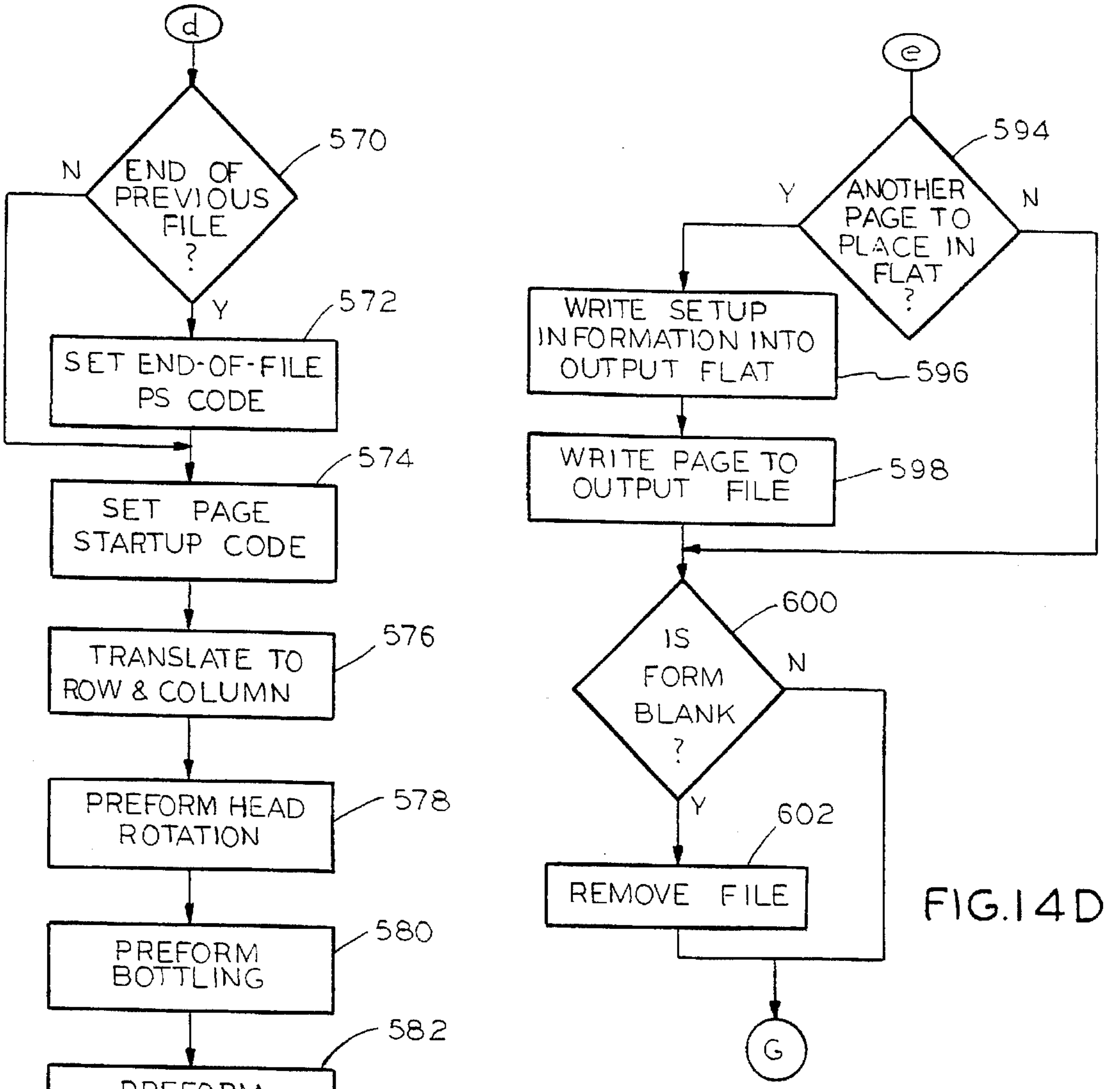
Figure 14E:
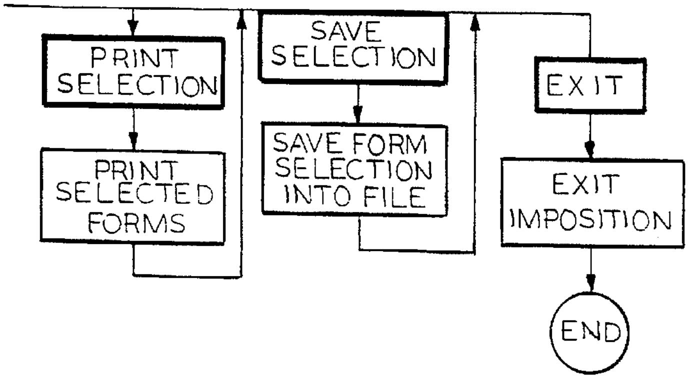

From the main menu, routines are also provided for printing selected forms as well as saving selected forms into a file otherwise exiting from the imposition module, see FIG. 14E.

Once the flat has been imposed, then it is either automatically printed using the auto spool routine or the operator can call up the spooling module 116, see FIG. 3, so that the files produced by the imposition module 114 are output to a selected output device, as discussed above.

The DPI system 30 has unique advantages over prior systems in the use of a press database to generate imposed film flats. Whereas prior systems save created templates corresponding to imposed flat deliveries from various presses, the DPI system 30 maintains a database describing the various press deliveries available at either local or remote sites. By saving the appropriate information in the press database, the DPI system 30 can directly impose flats without translating to an intermediate mechanism, i.e. templates, reducing storage requirements within the system significantly. Indeed, information in the press database requires much less storage than the corresponding imposed flat files, whether the corresponding imposed flat files are stored in bit map or page description language format. This implementation also eases operation of the system and the operator can describe the final imposed form in terms that are familiar, and need not perform the task of layout out an imposed flat template, either manually or electronically.

The use of the press database routine 118 and the printer's mark routine 122 allow for the generation and placement of printers' marks, representing both fixed and variable information, more easily. This avoids the requirement of manual generation of a film flat with new information manually entered. By designing printers' marks as dynamic information, and using information from the press database, printer mark database, job specification and other files, the DPI system 30 can automatically determine the information to be placed on the imposed flats instantaneously. This eliminates manually entering job unique information, thereby saving significant setup time.

The ability to specify multiple output devices, which are all connected to the system, each with different output characteristics provides a distinct advantage over prior systems.

The electronic communication link to customer systems provides page data files as well as job specification and stringout files directly to the system. This implementation significantly reduces the amount of time required for sending files from customer sites to the printing location by eliminating the need for manually shipping physical data, whether on printed paper or on electronic media.

We claim:

1. An imaging system for converting data representing a plurality of pages in a defined page description language format to produce files of imposed page data for imaging to film flats, comprising:

first memory means for electrically storing a data file representing a plurality of discrete pages in a defined page description language format;

second memory means for electrically storing press imposition data for a plurality of press deliveries each representing relative position of pages on an imposed flat;

selection means for selecting a single press delivery from the plurality stored in said second memory means;

programmed control means operatively associated with said first and second memory means and responsive to said selection means for converting data stored in said first memory means for a plurality of pages to a file of imposed page data for the selected press delivery; and output means driven by said programmed control means for imaging a film flat using the imposed page data for the selected press delivery.

2. The imaging system of claim 1 further comprising communication means operatively connected to said first memory means for electronically receiving data files representing a plurality of discrete pages in a defined page description language format for storage in said first memory means.

3. The imaging system of claim 1 wherein said programmed control means further comprises form breakup means for breaking a data file stored in said first memory means into a plurality of form files, each form file defining select pages from the data file to be included in a select film flat according to the selected press delivery.

4. The imaging system of claim 3 wherein said programmed control means converts data stored in said first memory means to a plurality of files of imposed page data, one for each said form file.

5. The imaging system of claim 1 wherein said output means comprises a film recorder.

6. The imaging system of claim 1 wherein said programmed control system comprises a programmed central processing unit (CPU) and said first and second memory means comprise memory storage devices electrically coupled to and controlled by said CPU.

7. The imaging system of claim 6 further comprising a modem connected to said CPU for receiving data files to be stored in said first memory means.

8. The imaging system of claim 1 further comprising spooling means operatively disposed between said programmed control means and said output means for controlling transfer of data from said programmed control means to said output means.

9. The imaging system of claim 1 wherein any said data file stored in said first memory means could be prepared using any one of a plurality of desktop publishing programs and said programmed control means includes processing means for converting said data file to a processed data file having standard page data for use in converting to imposed page data.

10. The imaging system of claim 1 wherein said programmed control means includes means for repositioning page data for any select page to ensure proper position of the page in a completed book.

11. An imaging system for converting data representing a plurality of pages in a defined page description language format to produce files of imposed page data for imaging to film flats, comprising:

first memory means for electrically storing data representing a plurality of discrete pages in a defined page description language format;

second memory means for storing data representing a plurality of printers marks for imaging on film flats;

third memory means for electrically storing press imposition data for a plurality of press deliveries each representing relative position of pages on an imposed flat and position of selected ones of said stored printers marks;

selection means for selecting a single press delivery from the plurality stored in said third memory means;

programmed control means operatively associated with each said memory means and responsive to said selection means for converting data stored in said first memory means for a plurality of pages to a file of imposed page data and including the selected printers marks for the selected press delivery; and output means driven by said programmed control means for imaging a film flat using the imposed page data for the selected press delivery.

12. The imaging system of claim 11 further comprising communication means operatively connected to said first memory means for electronically receiving data files representing a plurality of discrete pages in a defined page description language format for storage in said first memory means.

13. The imaging system of claim 11 wherein said programmed control means further comprises form breakup means for breaking a data file stored in said first memory means into a plurality of form files, each form file defining select pages from the data file to be included in a select film flat according to the selected press delivery.

14. The imaging system of claim 13 wherein said programmed control means converts data stored in said first memory means to a plurality of files of imposed page data, one for each said form file.

15. The imaging system of claim 11 wherein said output means comprises a film recorder.

16. The imaging system of claim 11 wherein said programmed control system comprises a programmed central processing unit (CPU) and said first and second memory means comprise memory storage devices electrically coupled to and controlled by said CPU.

17. The imaging system of claim 16 further comprising a modem connected to said CPU for receiving data files to be stored in said first memory means.

18. The imaging system of claim 11 further comprising spooling means operatively disposed between said programmed control means and said output means for controlling transfer of data from said programmed control means to said output means.

19. The imaging system of claim 11 wherein any said data file stored in said first memory means could be prepared using any one of a plurality of desktop publishing programs and said programmed control means includes processing means for converting said data file to a processed data file having standard page data for use in converting to imposed page data.

20. The imaging system of claim 11 wherein said programmed control means includes means for repositioning page data for any select page to ensure proper position of the page in a completed book.

21. An imaging system for converting data representing a plurality of pages in a defined page description language format to produce files of imposed page data for imaging to film flats, comprising:

communication means for electronically receiving data files representing a plurality of discrete pages in a defined page description language format;

first memory means coupled to said communication means for electrically storing data files;

second memory means for electrically storing press imposition data for a plurality of press deliveries each representing relative position of pages on an imposed flat;

selection means for selecting a single press delivery from the plurality stored in said second memory means;

programmed control means operatively associated with said first and second memory means and responsive to said selection means for converting data stored in said first memory means for a plurality of pages to a file of imposed page data for the selected press delivery; and output means driven by said programmed control means for imaging a film flat using the imposed page data for the selected press delivery.

22. The imaging system of claim 21 wherein said programmed control means further comprises means for analyzing a data file received by said communication means to determine the number of discrete pages in the data file.

23. The imaging system of claim 21 wherein said programmed control means further comprises form breakup means for breaking a data file stored in said first memory means into a plurality of form files, each form file defining select pages from the data file to be included in a select film flat according to the selected press delivery.

24. The imaging system of claim 23 wherein said programmed control means converts data stored in said first memory means to a plurality of files of imposed page data, one for each said form file.

25. The imaging system of claim 21 wherein said output means comprises a film recorder.

26. The imaging system of claim 21 wherein said programmed control system comprises a programmed central processing unit (CPU) and said first and second memory means comprise memory storage devices electrically coupled to and controlled by said CPU.

27. The imaging system of claim 26 further comprising a modem connected to said CPU for receiving data files to be stored in said first memory means.

28. The imaging system of claim 21 further comprising spooling means operatively disposed between said programmed control means and said output means for controlling transfer of data from said programmed control means to said output means.

29. The imaging system of claim 21 wherein any said data file stored in said first memory means could be prepared using any one of a plurality of desktop publishing programs and said programmed control means includes processing means for converting said data file to a processed data file having standard page data for use in converting to imposed page data.

30. The imaging system of claim 21 wherein said programmed control means includes means for repositioning page data for any select page to ensure proper position of the page in a completed book.

* * * * *